(12) United States Patent
Nasiri et al.

(10) Patent No.: US 7,458,263 B2
(45) Date of Patent: Dec. 2, 2008

(54) METHOD OF MAKING AN X-Y AXIS DUAL-MASS TUNING FORK GYROSCOPE WITH VERTICALLY INTEGRATED ELECTRONICS AND WAFER-SCALE HERMETIC PACKAGING

(75) Inventors: Steven S. Nasiri, Saratoga, CA (US); Joseph Seeger, Menlo Park, CA (US); Martin Lim, San Mateo, CA (US); Anthony Francis Flannery, Jr., Los Gatos, CA (US); Alexander Castro, Sunnyvale, CA (US)

(73) Assignee: Invensense Inc., Santa Clara, CA (US)

( * ) Notice: Subject to any disclaimer, the term of this patent is extended or adjusted under 35 U.S.C. 154(b) by 0 days.

(21) Appl. No.: 11/283,083

(22) Filed: Nov. 18, 2005

(65) Prior Publication Data

US 2006/0219006 A1 Oct. 5, 2006

Related U.S. Application Data

(63) Continuation-in-part of application No. 11/193,127, filed on Jul. 28, 2005, now Pat. No. 7,250,112, which is a continuation of application No. 10/691,472, filed on Oct. 20, 2003, now Pat. No. 6,939,473.

(51) Int. Cl.
*G01C 19/00* (2006.01)
*G01P 9/04* (2006.01)
*G01P 1/02* (2006.01)

(52) U.S. Cl. ............... 73/504.12; 73/504.04; 73/493

(58) Field of Classification Search .............. 73/510, 73/514.32, 514.29, 511, 504.14, 504.12, 73/504.04, 493, 431, 514.16
See application file for complete search history.

(56) References Cited

U.S. PATENT DOCUMENTS

| | | | | |
|---|---|---|---|---|
| 5,083,466 | A | * | 1/1992 | Holm-Kennedy et al. ............... 73/862.041 |
| 5,359,893 | A | | 11/1994 | Dunn |
| 5,703,293 | A | * | 12/1997 | Zabler et al. ............. 73/504.02 |
| 5,780,740 | A | | 7/1998 | Lee et al. |
| 5,895,850 | A | | 4/1999 | Buestgens |
| 5,992,233 | A | | 11/1999 | Clark ................... 73/514.35 |
| 5,996,409 | A | * | 12/1999 | Funk et al. ............. 73/504.04 |
| 6,122,961 | A | | 9/2000 | Geen et al. ............. 73/504.12 |
| 6,189,381 | B1 | | 2/2001 | Huang et al. |
| 6,250,157 | B1 | | 6/2001 | Touge |
| 6,391,673 | B1 | | 5/2002 | Ha et al. ..................... 438/51 |
| 6,430,998 | B2 | | 8/2002 | Kawai et al. ............. 73/504.12 |
| 6,480,320 | B2 | | 11/2002 | Nasiri ....................... 359/291 |

(Continued)

OTHER PUBLICATIONS

PCT, Notification of Transmittal of The International Search Report and the Written Opinion of the International Searching Authority, or the Declaration, Feb. 7, 2008.

*Primary Examiner*—Helen C. Kwok
(74) *Attorney, Agent, or Firm*—Sawyer Law Group LLP

(57) ABSTRACT

A dual-axis sensor for measuring X and Y components of angular velocity in an X-Y sensor plane is provided. The dual-axis sensor includes a first subsensor for measuring the X component of angular velocity, and a second subsensor for measuring the Y component of angular velocity. The first subsensor and the second subsensor are contained within a single hermetic seal within the dual-axis sensor.

27 Claims, 19 Drawing Sheets

U.S. PATENT DOCUMENTS

| | | | |
|---|---|---|---|
| 6,481,283 B1 | 11/2002 | Cardarelli | 73/504.02 |
| 6,481,284 B2 | 11/2002 | Geen et al. | 73/504.02 |
| 6,481,285 B1 | 11/2002 | Shkel et al. | 73/504.13 |
| 6,487,908 B2 | 12/2002 | Geen et al. | 73/504.12 |
| 6,508,122 B1 | 1/2003 | McCall et al. | 73/504.12 |
| 6,513,380 B2 | 2/2003 | Reeds, III et al. | 73/504.12 |
| 6,533,947 B2 | 3/2003 | Nasiri et al. | 216/2 |
| 6,794,272 B2 | 9/2004 | Turner et al. | 438/459 |
| 6,796,178 B2 | 9/2004 | Jeong et al. | 73/504.02 |
| 6,892,575 B2 * | 5/2005 | Nasiri et al. | 73/504.12 |
| 6,918,297 B2 * | 7/2005 | MacGugan | 73/504.15 |
| 6,939,473 B2 | 9/2005 | Nasiri et al. | |
| 7,004,025 B2 * | 2/2006 | Tamura | 73/511 |
| 7,028,547 B2 * | 4/2006 | Shiratori et al. | 73/495 |
| 7,196,404 B2 * | 3/2007 | Schirmer et al. | 257/676 |
| 2002/0051258 A1 | 5/2002 | Tamura | |
| 2003/0074967 A1 | 4/2003 | Tang et al. | 73/504.02 |
| 2003/0110858 A1 | 6/2003 | Kim et al. | 73/504.02 |
| 2003/0164041 A1 | 9/2003 | Jeong et al. | 73/504.08 |
| 2004/0055380 A1 | 3/2004 | Shcheglov et al. | 73/504.12 |
| 2005/0081633 A1 | 4/2005 | Nasiri et al. | |

* cited by examiner

A-A

METHOD OF MAKING AN X-Y AXIS DUAL-MASS TUNING FORK GYROSCOPE WITH VERTICALLY INTEGRATED ELECTRONICS AND WAFER-SCALE HERMETIC PACKAGING

CROSS-REFERENCE TO RELATED APPLICATIONS

This application is a Continuation In-Part of U.S. patent application Ser. No. 11/193,127, entitled "Method of Making an X-Y Axis Dual-Mass Tuning Fork Gyroscope with Vertically Integrated Electronics and Wafer-Scale Hermetic Packaging", filed Jul. 28, 2005 now U.S. Pat. No. 7,250,112, which is a continuation of U.S. patent application Ser. No. 10/691,472 filed Oct. 20, 2003, now U.S. Pat. No. 6,939,473.

FIELD OF THE INVENTION

This invention relates to angular velocity sensors, and more particularly to in-plane angular velocity sensors having two oscillating proof masses.

BACKGROUND

Sensing of angular velocity is frequently performed using an inertial sensor. Inertial angular velocity sensors broadly function by driving the sensor into a first motion and measuring a second motion of the sensor that is responsive to both the first motion and the angular velocity to be sensed.

Frequently, a mass (usually referred to as a proof mass) within the sensor is driven into oscillation by an actuator. Rotation of the sensor imparts a Coriolis force to the oscillating mass that is proportional to the angular velocity (or rotation rate), and depends on the orientation of the angular velocity vector with respect to the velocity vector of the proof mass. The Coriolis force, the angular velocity vector and the mass velocity vector are mutually orthogonal. For example, a proof mass moving in an X direction within a sensor rotating about a Y-axis experiences a Z-directed Coriolis force. Similarly, a proof mass moving in an X direction within a sensor rotating about a Z axis experiences a Y-directed Coriolis force. Finally, a proof mass moving in an X direction within a sensor rotating about the X-axis experiences no Coriolis force. Coriolis forces imparted to the proof mass are usually sensed indirectly by measuring motions within the sensor that are responsive to the Coriolis forces.

Recently, the development of micromachining technology (also known as MEMS technology) has led to the development of various MEMS angular velocity inertial sensors. MEMS technology is basically a planar technology, where suitable MEMS actuators for driving in-plane motion tend to differ significantly from suitable MEMS actuators for driving out-of-plane motion. Similarly, suitable MEMS sensors for measuring in-plane motion responsive to Coriolis forces tend to differ significantly from suitable MEMS sensors for measuring out-of-plane motion responsive to Coriolis forces. These differences are both structural differences and performance differences.

An in-plane MEMS angular velocity sensor must either drive an out-of-plane motion or sense an out-of-plane motion in order to detect an in-plane angular velocity component, due to the orthogonality of mass velocity, angular velocity and Coriolis force discussed above. In contrast, an out-of-plane MEMS angular velocity sensor can drive and sense two orthogonal in-plane motions in order to detect an out-of-plane angular velocity component. Due to the planar nature of MEMS technology, in-plane MEMS sensors and out-of-plane MEMS sensors tend to differ significantly.

Some known in-plane MEMS angular velocity sensors have two proof masses driven into oscillation. For example, U.S. Pat. No. 6,481,283 to Cardarelli teaches an in-plane MEMS sensor. In the coordinates of Cardarelli, the device plane is the YZ plane. In a first embodiment, Cardarelli teaches two masses dithered in the +/−Y direction (i.e., in-plane). Angular velocity about a Z-axis leads to X-directed Coriolis forces on the two masses. The two masses are attached to a gimbal rotatable about the Z-axis such that X-directed forces on the masses provide Z-directed torques on the gimbal. The two masses are dithered to have oppositely directed velocities, so the two Coriolis forces provides a net torque on the gimbal about the Z-axis. Motion of the gimbal about the Z-axis is sensed.

In a second embodiment, Cardarelli teaches two masses dithered in the +/−X direction (i.e., out-of-plane). Angular velocity about a Z-axis leads to Y-directed Coriolis forces on the two masses. The two masses are attached to a gimbal rotatable about the Z-axis such that Y-directed forces on the masses provide Z-directed torques on the gimbal. The two masses are dithered to have oppositely directed velocities, so the two Coriolis forces provides a net torque on the gimbal about the Z-axis. Motion of the gimbal about the Z-axis is sensed.

Another known in-plane MEMS angular velocity sensor having two proof masses driven into oscillation is taught in U.S. Pat. No. 6,508,122 to McCall et al. McCall et al. teach an in-plane MEMS sensor having two unconnected masses that are laterally disposed in the device plane and dithered out of phase with respect to each other in this plane direction. For definiteness, let the device plane be the XY plane, and let the dither be in the X direction. The masses oscillate in the Z direction when the sensor is rotated about the Y-axis, due to Z-directed Coriolis forces. The Z-directed oscillation of the masses is sensed.

The approaches of both Cardarelli and McCall et al. are motivated by a desire to reject "common mode" interference from the measurement of angular velocity. For example, an angular velocity sensor having a single proof mass can register an incorrect reading if subjected to a linear acceleration in the same direction as the Coriolis force to be sensed. With two masses, various arrangements are possible, including those mentioned above, that respond to Coriolis forces but generally do not respond to linear acceleration in the same direction as the Coriolis forces. Typically, such arrangements depend on driving the two masses so that their velocities are always equal and opposite. Any deviation from a condition of equal and opposite velocities is disadvantageous, since such deviation reduces the desired response to the Coriolis forces, and increases the undesired response to linear acceleration.

However, in practice it is not straightforward to drive two masses with equal and opposite velocities. For example, two nominally identical and identically mounted masses can differ in practice so that actuating these two masses with the same actuation provides velocities which are not equal and opposite. Actuators tend to vary in effectiveness as well, so even if two masses were identical and identically mounted, variation in the actuators connected to the two masses could again provide mass velocities which are not equal and opposite. Similarly, circuitry connected to actuators may not be identical, etc. As a result, known two mass in-plane angular velocity sensors generally have not fully realized the common mode rejection promised by two mass configurations.

OBJECTS AND ADVANTAGES

An object of the invention to provide an in-plane angular velocity sensor having improved measurement accuracy due to mechanically constraining the two masses to move in opposite directions, thereby improving common mode rejection.

Another object of the invention is to provide an angular velocity sensor having reduced cost due to vertical integration of sense and drive electronics.

A further object of the invention is to provide an angular velocity sensor having low cost hermetic packaging.

Yet another object of the invention is to provide an angular velocity sensor having improved performance due to the use of bulk MEMS technology providing larger proof masses having increased travel distance.

Another object of the invention is to provide an angular velocity sensor having improved performance and reduced cost by use of torsionally mounted and electrostatically driven plates having lever arms attached to the masses, to increase mass travel distance.

A further object of the invention is to provide a low cost dual-axis in-plane gyroscope module having an X-axis angular velocity sensor and a Y-axis angular velocity sensor integrated onto the same device die.

SUMMARY

In general, in one aspect, this specification describes a dual-axis sensor for measuring X and Y components of angular velocity in an X-Y sensor plane. The dual-axis sensor includes a first subsensor for measuring the X component of angular velocity, and a second subsensor for measuring the Y component of angular velocity. The first subsensor for measuring the X component of angular velocity and the second subsensor for measuring the Y component of angular velocity are contained within a single hermetic seal within the dual-axis sensor.

Particular implementations can include one or more of the following features. The first subsensor and the second subsensor can be separated by a barrier seal within the single hermetic seal. The barrier seal can reduce acoustic coupling between the first subsensor and the second subsensor. The barrier seal can include one or more channels formed therein to permit pressure equalization on both the first subsensor and the second subsensor within the single hermetic seal. The dual-axis sensor can be fabricated using bulk silicon fabrication. The first subsensor and the second subsensor can be contained within a rectangular cavity of the dual-axis sensor. The dual-axis sensor can further include a membrane formed over the rectangular cavity. The dual-axis sensor can further include one or more posts to support the membrane in the cavity.

The dual-axis sensor can further include one or more posts to support wafer level integration of a reference wafer associated with the dual-axis sensor, in which the reference wafer forms a lower portion of the single hermetic seal. The one or more posts can provide temporary support of the membrane during the fabrication of mechanical elements associated with the first subsensor and the second subsensor. The dual-axis sensor can further include stress isolation features for sense mode frequency. The stress isolation feature can include one or more beams. The dual-axis sensor can further include stress isolation features for robustness during fabrication of the dual-axis sensor. A sense mode frequency of the dual-axis sensor can be less than a drive mode frequency of the dual-axis sensor. The dual-axis sensor can further include a frame including one or more tabs or grooves to limit motion of mechanical elements associated with the first subsensor and the second subsensor.

The first subsensor can include a first sensing subassembly, a first actuator for driving a first portion of the first sensing subassembly into oscillation at a drive frequency, and a first transducer for sensing motion of a second portion of the first sensing subassembly responsive to the X component of angular velocity. The second subsensor can include a second sensing subassembly, a second actuator for driving a first portion of the second sensing subassembly into oscillation at a drive frequency, and a second transducer for sensing motion of a second portion of the second sensing subassembly responsive to the Y component of angular velocity. The first and second linkages can be designed such that in the presence of undesired Z-axis motion, lateral motion is limited by tab and grooves within the dual-axis sensor. The first and second linkages can include one or more beams. Drive motions of the first, second, third, and fourth masses associated with the dual-axis sensor can be sensed indirectly. The first, second, third, and fourth masses can be actuated indirectly.

The dual-axis sensor can further include one or more split electrodes to indirectly actuate the first, second, third, and fourth masses. One or more split electrodes can be located on edge plates associated with the dual-axis sensor. The dual-axis sensor can further include one or more electrodes disposed on the first and second frames to differentially sense motion of the first and second frames. The dual-axis sensor can be operable to drive a Z-axis motion to sense resonance associated with the dual-axis gyroscope in a self-test mode. The dual-axis sensor can further include one or more shields to shield one or more mechanical elements associated with the first subsensor and the second subsensor from electromagnetic interference (EMI). The first subsensor and the second subsensor can be operated at frequencies separated by more than 500 Hz. The dual-axis sensor can further include one or more actuators to actuate rotation of a frame of the dual-axis sensor during a self-test mode of operation for measurement of a sense mode frequency associated with the dual-axis sensor. Each of the one or more actuators can be electrostatic actuators. One or more of the electrostatic actuators can utilize a parallel plate electrode configuration or a comb finger electrode configuration.

DETAILED DESCRIPTION OF THE DRAWINGS

Figure 1:
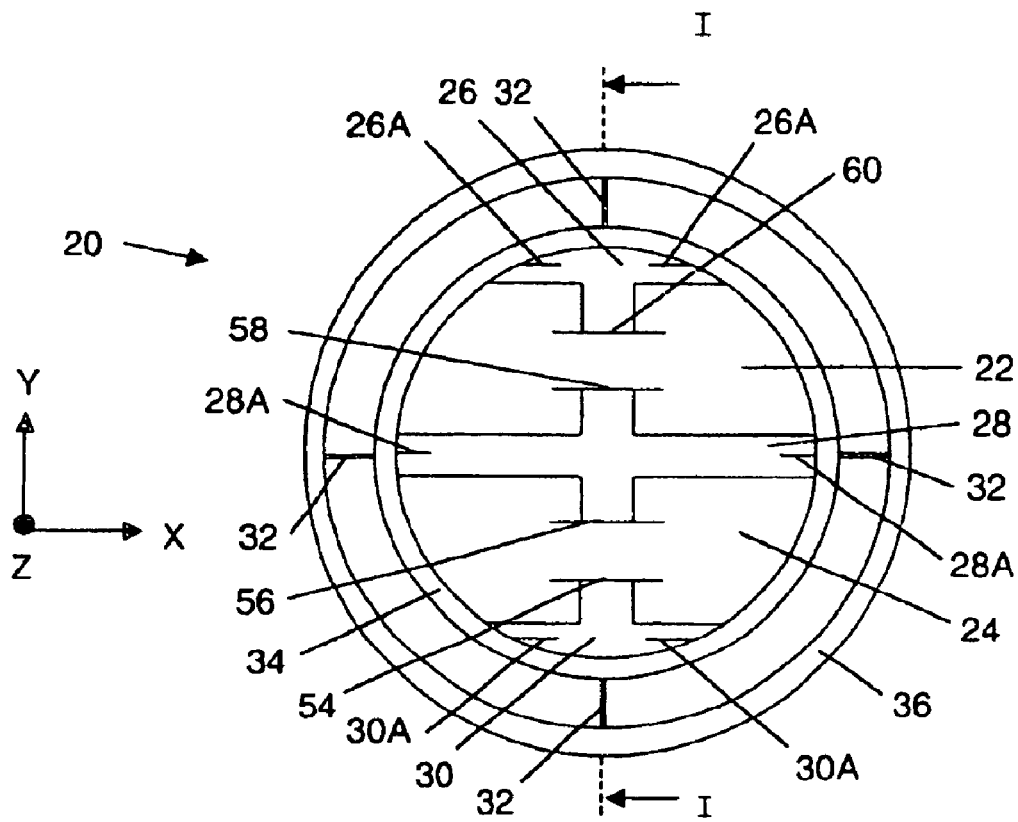
FIG. 1 schematically shows a plan view of a gyroscope wafer according to one embodiment of the present invention.

FIG. 1 schematically shows a plan view of a gyroscope wafer 20 according to one embodiment of the invention. In the embodiment of FIG. 1, the various elements indicated on the Figure are preferably fabricated from a single Silicon wafer. The mechanical configuration of gyroscope wafer 20 will be considered first, followed by its operation. Finally the fabrication of gyroscope wafer 20 will be discussed.

Mechanical Configuration

In the embodiment of FIG. 1, a center plate 28 is attached to a frame 34 by torsional hinges 28A, which permit center plate 28 to rotate about the X axis on FIG. 1. Hinges 28A may also provide a restoring torque on plate 28 that tends to restore its position to a nominal position in the X-Y plane. A proof mass 22 is attached to center plate 28 by a hinge 58, and a proof mass 24 is attached to center plate 28 by a hinge 56. The subassembly of center plate 28, proof mass 22 and proof mass 24 together make up a linkage, such that proof masses 22 and 24 necessarily move in opposite directions along the Z axis.

It is preferred to incorporate additional elements into the linkage as follows: a first edge plate 26 is attached to proof mass 22 by a hinge 60 and is attached to frame 34 by torsional hinges 26A; and a second edge plate 30 is attached to proof mass 24 by a hinge 54 and is attached to frame 34 by torsional hinges 30A. Torsional hinges 26A and 30A permit plates 26 and 30, respectively, to rotate about the X axis on FIG. 1, and may also provide restoring torques to plates 26 and 30, respectively, which tend to restore the positions of plates 26 and 30 to their nominal positions in the X-Y plane.

Frame 34 is attached to a base 36 with a plurality of flexures 32. Flexures 32 are arranged to provide a restoring torque to frame 34 when it is rotated about the Z axis to a position which differs from its nominal position. FIG. 1 shows four flexures 32, symmetrically disposed about the perimeter of frame 34. Although a symmetrical flexure configuration providing good mechanical support for frame 34, such as the configuration of FIG. 1, is preferred, the invention does not require such a flexure configuration.

Rotation of frame 34 with respect to base 36 can be sensed with capacitive sensors disposed in between and connected to frame 34 and base 36. Alternatively, frame 34 can be driven into angular oscillation about the Z axis using electrostatic actuators disposed in between and connected to frame 34 and base 36. Various configurations are known in the art for such capacitive sensors and electrostatic actuators, and in many cases a particular electrode configuration can provide either function.

Figure 5:
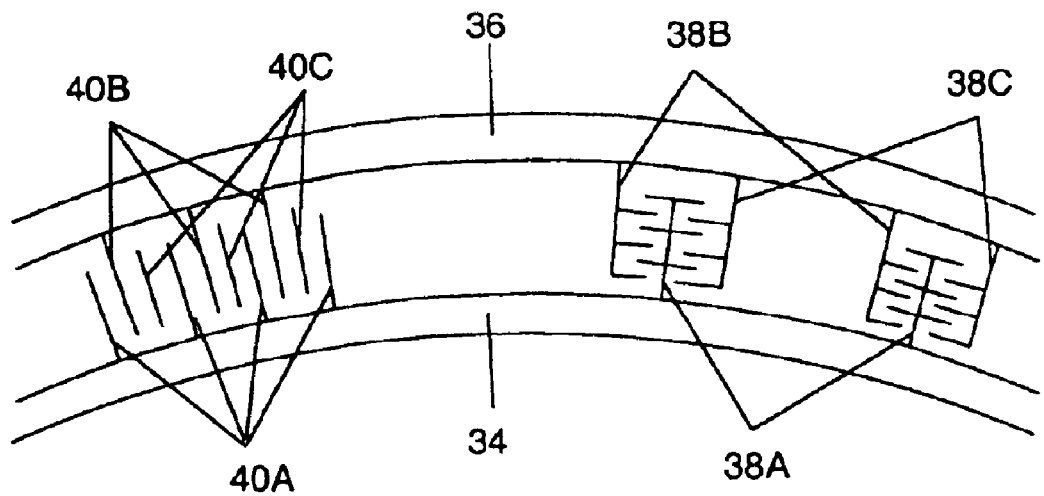
FIG. 5 schematically shows two electrode configurations suitable for use with the present invention.

Two exemplary electrode configurations suitable for sensing and/or driving relative angular motion of frame 34 with respect to base 36 are schematically illustrated on FIG. 5 as 38A, 38B, and 38C and 40A, 40B, and 40C. These, or similar, electrode configurations are preferably disposed symmetrically around the perimeter of frame 34. Practice of the invention does not require any particular electrode configuration.

The elements within frame 34 on FIG. 1 (i.e., the preferred linkage including masses 22 and 24, and plates 26, 28, and 30) are attached to frame 34 only by hinges 26A, 28A and 30A. There is a gap in between frame 34 and masses 22 and 24. Other than at attachment points for these hinges, there is also a gap in between frame 34 and plates 26, 28, and 30. These gaps are large enough to permit the linkage to move through its design range without colliding with frame 34. These gaps are not shown on FIG. 1.

Figure 2:
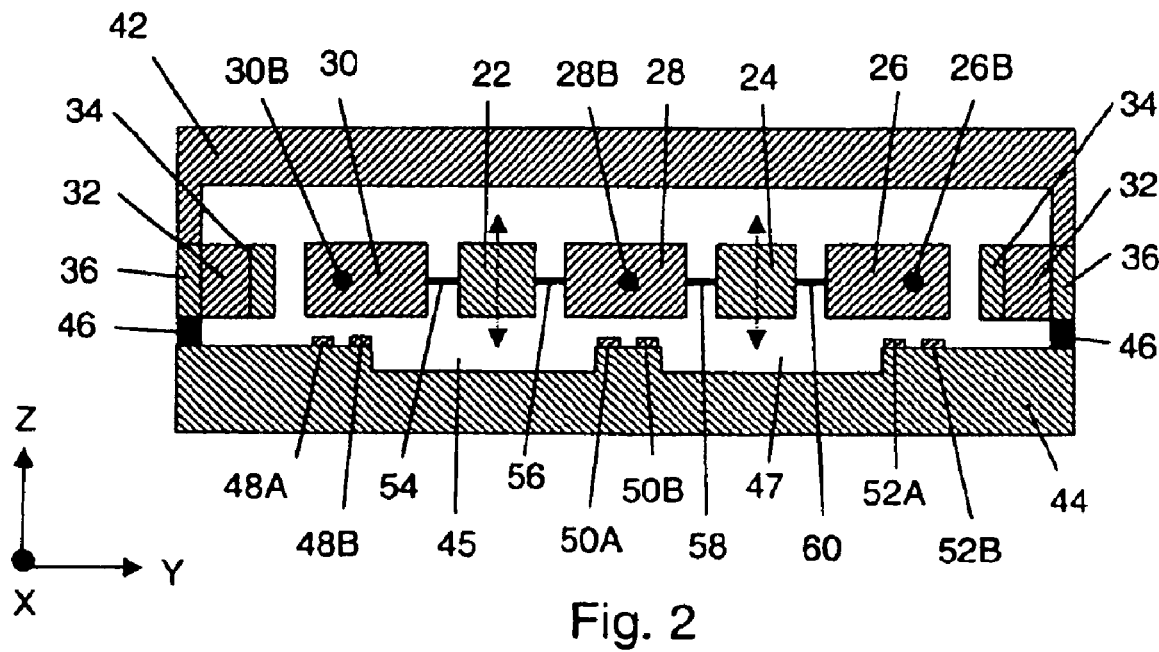
FIG. 2 schematically shows a cross section view of an embodiment of the invention, including a cross section view of the gyroscope wafer of FIG. 1 along line I.

FIG. 2 schematically shows a cross section view of an embodiment of the invention. This cross section view includes a cross section view of gyroscope wafer 20 of FIG. 1 along line I. Gyroscope wafer 20 of FIG. 1 is preferably affixed to a cap wafer 42 and to a reference wafer 44 such that gyroscope wafer 20 is sandwiched in between cap wafer 42 and reference wafer 44 as shown on FIG. 2. With this configuration, cap wafer 42 and reference wafer 44 combine to protect gyroscope wafer 20 from an ambient environment, thereby increasing the reliability and ruggedness of the sensor. Furthermore, the bonds in between gyroscope wafer 20 and wafers 42 and 44 can be made so as to provide a hermetic barrier in between critical elements of gyroscope wafer 20, such as the moving masses 22 and 24, and the ambient environment.

Figure 11A:
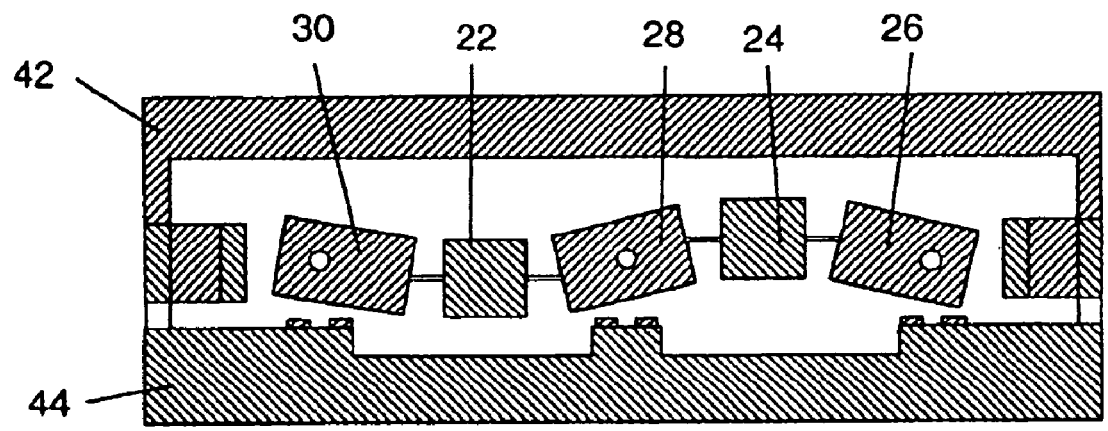
FIGS. 11a and 11b schematically show how the configuration of FIG. 2 moves in operation.
Figure 11B:
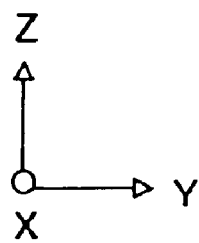
Figure 11B:
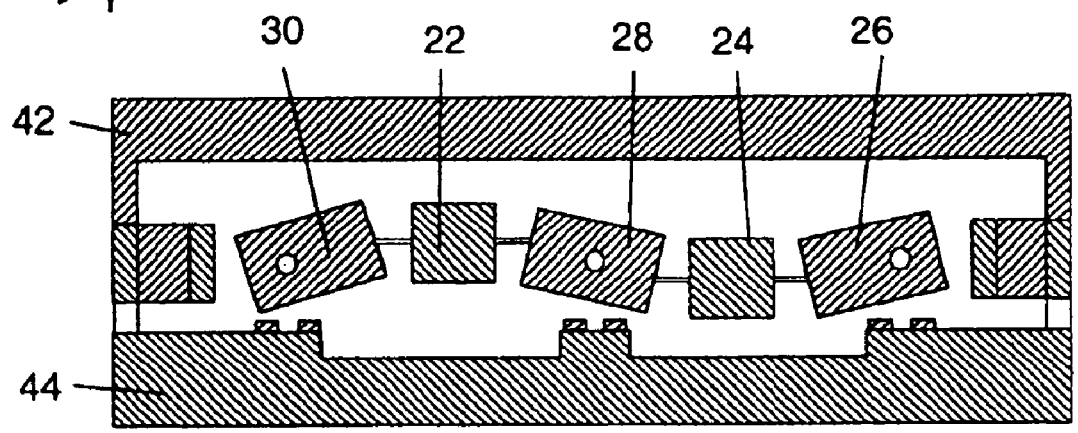

The motion of the linkage including masses 22 and 24, as well as plates 26, 28, and 30, is best appreciated in connection with FIGS. 2, 11a and 11b. Points 26B, 28B and 30B on FIG. 2 are aligned with torsional hinges 26A, 28A and 30A respectively, so plates 26, 28 and 30 can rotate in the plane of FIG. 2 (the Y-Z plane) about points 26B, 28B and 30B respectively. The components of this linkage are connected together by flexure hinges 54, 56, 58, and 60, which inhibit relative translation of adjacent components, but allow relative rotation of adjacent components in the Y-Z plane.

Accordingly, when mass 22 moves in the +Z direction on FIG. 2 (i.e., up on FIG. 2), plate 28 rotates clockwise about point 28B and mass 24 must move in the −Z direction, while plates 26 and 30 rotate counterclockwise, as shown on FIG. 11b. Likewise, when mass 22 moves in the −Z direction, plate 28 rotates counterclockwise, and mass 24 moves in the +Z direction, while plates 26 and 30 rotate clockwise, as shown on FIG. 11a. In other words, the linkage formed by mass 22, mass 24 and plates 26, 28, and 30 ensures that masses 22 and 24 necessarily move in opposite directions along the Z axis. As discussed above, there are gaps in between frame 34 and plate 26 and in between frame 34 and plate 30, which are apparent on FIG. 2.

Cap wafer 42 and reference wafer 44 are attached to base 36 of gyroscope wafer 20, and do not make contact with any other component of gyroscope wafer 20, as shown on FIG. 2. Since flexures 32 and frame 34 make no contact with cap wafer 42, or with reference wafer 44, these wafers do not interfere with rotation of frame 34 about the Z axis. The connection between reference wafer 44 and base 36 is schematically indicated as 46 on FIG. 2. Connection 46 is both a mechanical connection between reference wafer 44 and base 36 and an electrical connection between reference wafer 44 and base 36. In this manner, circuitry on reference wafer 44 is connected to sense/drive means on gyroscope wafer 20, such as electrodes 38A, 38B, 38C or electrodes 40A, 40B, 40C on FIG. 5.

Electrodes 48A and 48B are positioned on reference wafer 44 beneath plate 30. Electrodes 48A and 48B are positioned on either side of the rotation axis of plate 30, indicated as point 30B on FIG. 2. Similarly, electrodes 50A and 50B are positioned beneath plate 28, and electrodes 52A and 52B are positioned beneath plate 26.

Figure 3:
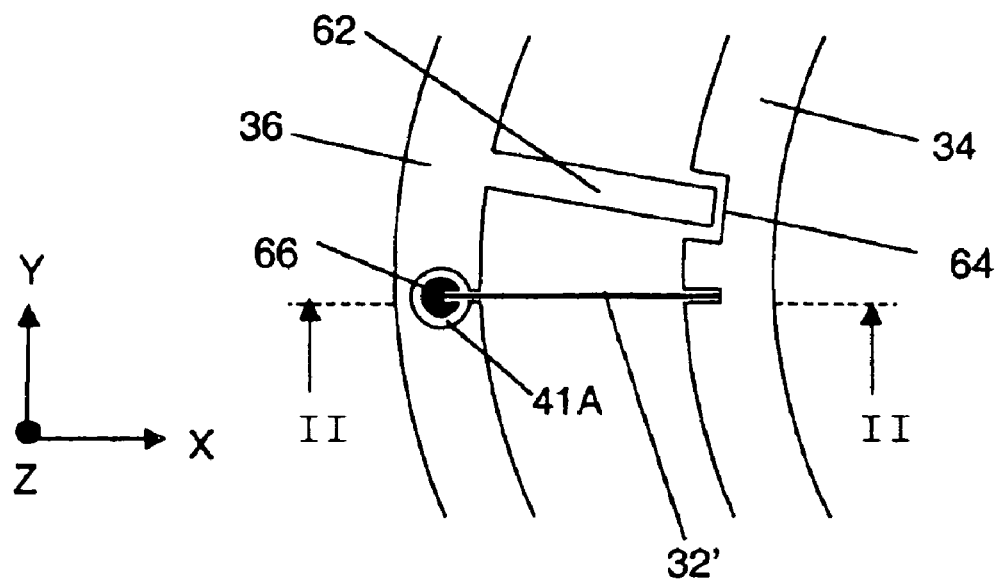
FIG. 3 schematically shows a plan view showing details of a preferred flexure configuration.

FIG. 3 schematically shows a more detailed plan view of a preferred configuration for flexure 32 on FIG. 1. In the configuration of FIG. 3, flexure 32 comprises a spring 32' and a base flexure mount 66. As indicated on FIG. 3, the attachment point of spring 32' to mount 66 is recessed into mount 66, and similarly for frame 34, to reduce the coupling of surface stresses from mount 66 to spring 32' and from frame 34 to spring 32'.

Base flexure mount 66 is surrounded by a base isolation trench 41A, which serves to mechanically isolate flexure 32 from stresses within base 36. Such stresses can be transmitted to base 36 by cap wafer 42 and reference wafer 44 as a result of packaging and/or bonding processes, thermal expansion, etc. A base tab 62 is also shown on FIG. 3, which is engaged with a frame groove 64. Frame groove 64 is somewhat larger than the width of base tab 62, as schematically indicated on FIG. 3, so that frame 34 can rotate only within a certain selected range relative to base 36 before base tab 62 collides with a wall of frame groove 64. This selected range is chosen to ensure that flexure 32 is not damaged by motion within the selected range. In this manner, the combination of tab 62 and groove 64 provides protection for flexure 32.

Figure 4:
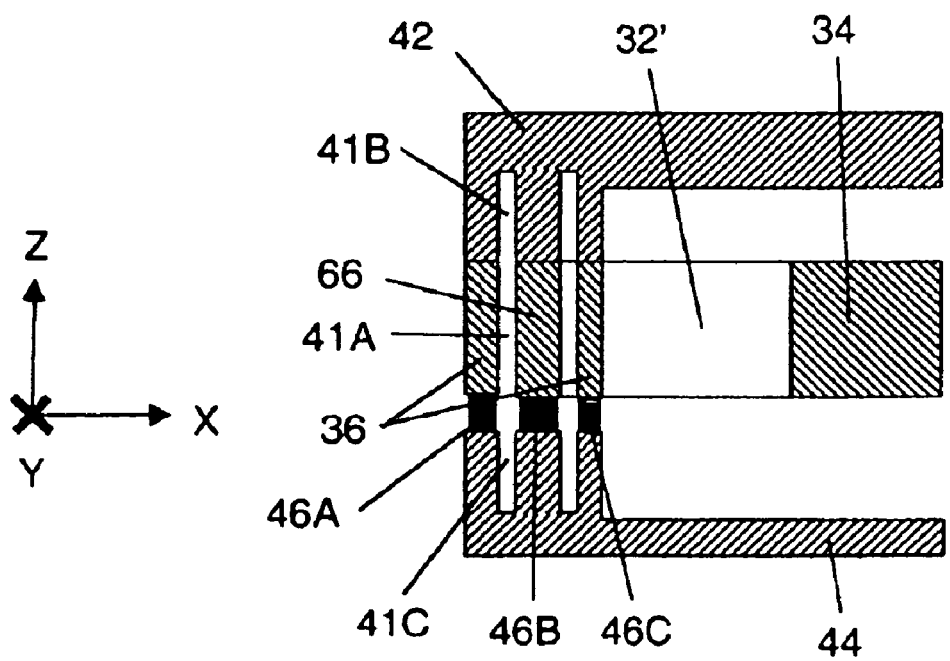
FIG. 4 schematically shows a cross section view of the flexure configuration of FIG. 3 along line II.

Further details of a preferred configuration for flexure 32 are shown in the cross section view of FIG. 4, which includes a cross section view of FIG. 3 along line II. Line II is immediately adjacent to spring 32', but does not cut through it, which is why spring 32' is not shown as a cross section on FIG. 4. In one embodiment, base flexure mount 66 is affixed to cap wafer 42 and is connected to reference wafer 44 via a connection 46B. In this manner, flexure 32 is connected to cap wafer 42 and reference wafer 44, and isolation from base 36. This is advantageous because cap wafer 42 and reference wafer 44 are typically much thicker than base 36 (a typical thickness for gyroscope wafer 20 is only 50 microns), and therefore provide much greater mechanical rigidity for anchoring flexure 32. Also shown on FIG. 4 is a reference isolation trench 41C, and a cap isolation trench 41B. Reference isolation trench 41C serves to isolate flexure 32 from stresses which may be present in the top surface of reference wafer 44 (i.e., the surface of reference wafer 44 that is bonded to base 36). Similarly, cap isolation trench 41B serves to isolate flexure 32 from stresses which may be present in the bottom surface of cap wafer 42 (i.e., the surface of cap wafer 42 that is bonded to base 36). Although the flexure configuration of FIGS. 3 and 4, where flexure 32 comprises spring 32' and base mount 66 is preferred, it is not necessary to practice the invention.

Figure 6:
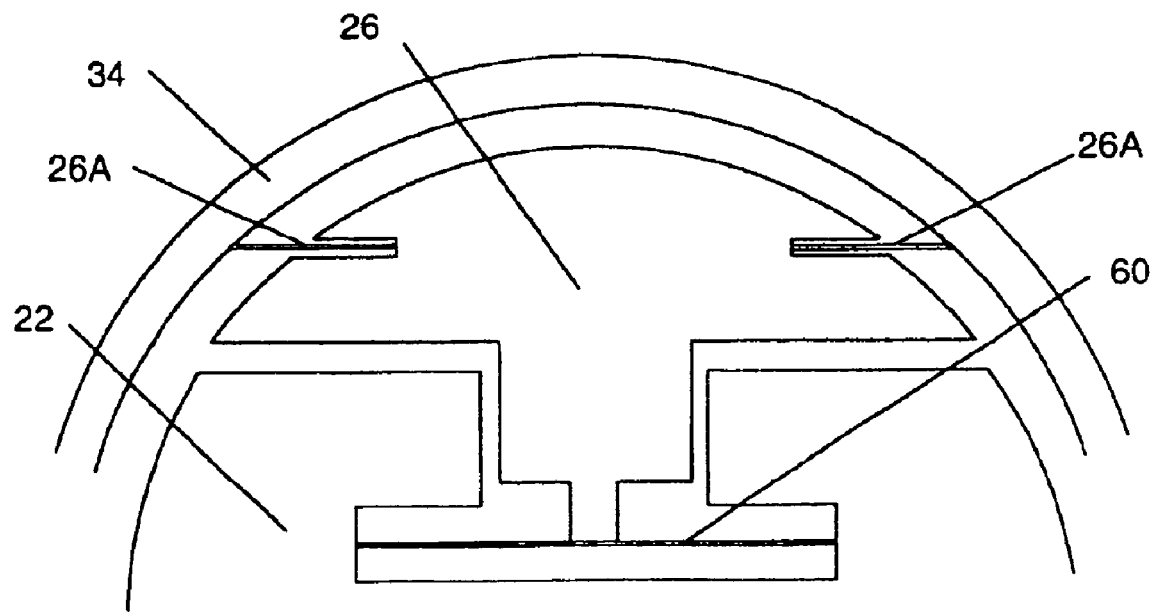
FIG. 6 schematically shows an enlarged view of a portion of the gyroscope wafer of FIG. 1.

FIG. 6 schematically shows an enlarged plan view of a portion of gyroscope wafer 20, which shows a preferred configuration of torsional hinges 26A and flexure hinge 60 in greater detail. As shown on FIG. 6, plate 26 is attached to frame 34 by torsional hinges 26A. The configuration of torsional hinges 26A is such that plate 26 can rotate about the axis connecting the centers of torsional hinges 26A. As shown on FIG. 6, slots are formed in plate 26 to increase the length of torsional hinges 26A. This is done in order to reduce the strain required on torsional hinges 26A to accommodate a given rotation of plate 26.

Plate 26 is connected to mass 22 with flexure hinge 60. The configuration of flexure hinge 60 is such that plate 22 can tilt relative to mass 26 (and vice versa). As shown on FIG. 6, a slot is formed in mass 22 to increase the length of flexure hinge 60, in order to reduce the strain required on flexure hinge 60 to accommodate a given tilt of mass 22 with respect to plate 26.

The configurations of flexure hinges 58, 56, and 54 are preferably similar to the configuration shown on FIG. 6 for flexure hinge 60. Likewise, the configurations of torsional hinges 28A and 30A are preferably similar to the configuration shown on FIG. 6 for torsional hinge 26A. The hinge configurations shown in FIG. 6 pertain to a preferred embodiment of the invention. Practice of the invention does not require any particular hinge configuration.

Figure 19:
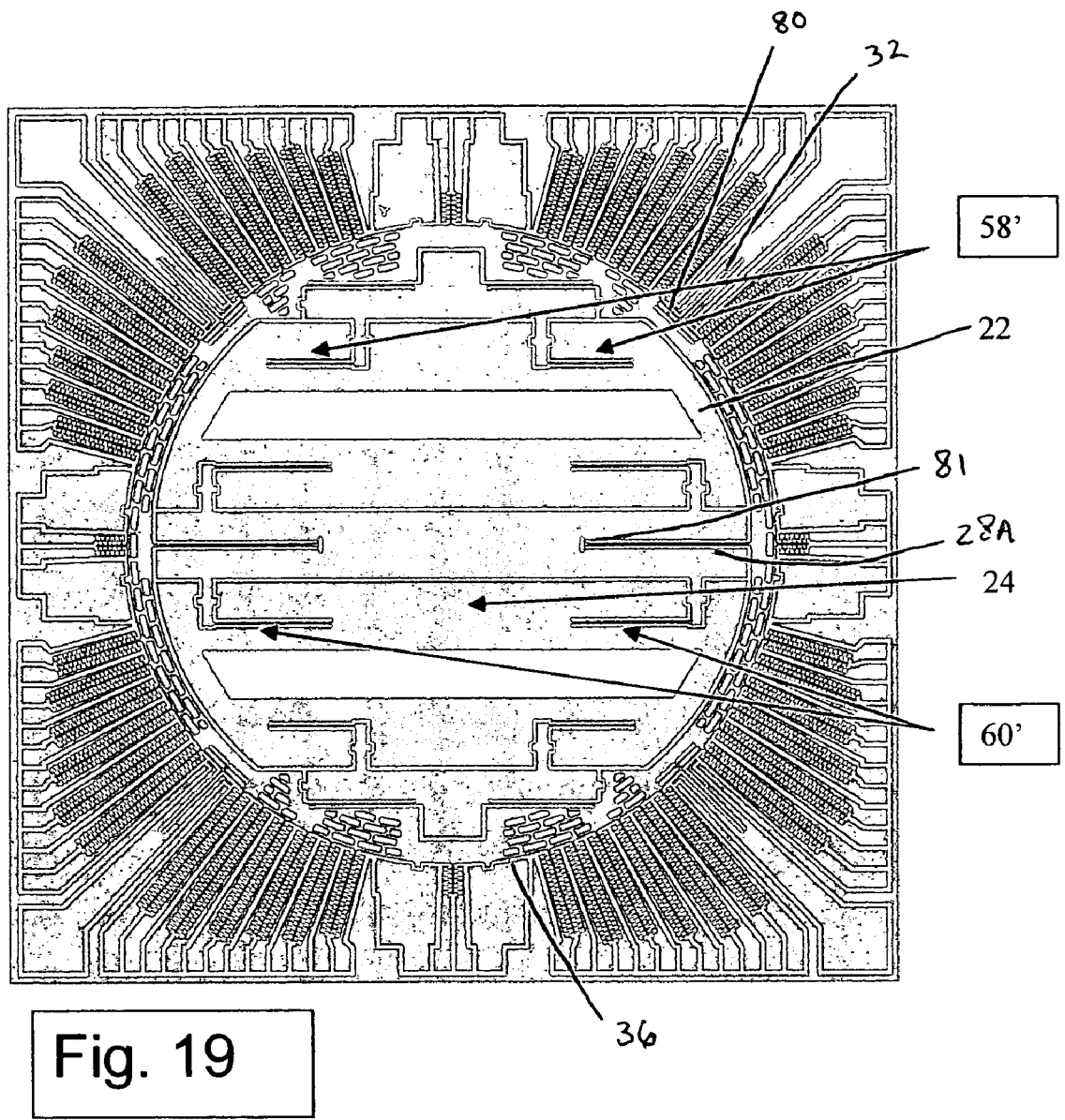
FIG. 19 schematically shows a plan view of a gyroscope wafer according to one embodiment of the present invention.

FIG. 19 schematically shows a plan view of a gyroscope wafer 20 according to one embodiment of the invention. FIG. 19 schematically depicts a beam isolation flexure 80 attached to flexure 32. The beam isolation flexure 80 reduces the coupling of planar strains from stresses exerted on the base 36. These stresses act on flexures 32 and cause shifts in the fundamental sense mode frequency. The beam isolation flexure 80 (comprising a minimum of one beam) provides compliance in the mechanical system attached to flexures 32 relieving the stress that is exerted on flexures 32. A plurality of beams may be designed for proper stress coupling reduction.

FIG. 19 also schematically depicts a fabrication flexure 81 attached to torsional hinge 28A that aids in the fabrication of a gyroscope according to one embodiment. The centrally located torsional hinge 28A supports center plate 28 through linkages to mass 22. During the sequence of steps suitable for fabricating the gyroscope wafer 20, stresses may be exerted on the gyroscope wafer 20 or portions thereof. These stresses may be concentrated in specific locations. The attachment of fabrication flexure 81 on to the central torsional hinge 28A improves the robustness and integrity of the hinge 28A throughout the fabrication sequence. An exemplary fabrication step is the Deep Reactive Ion Etch (DRIE) which forms the mechanical elements of the gyroscope wafer 20. The DRIE process exerts a thermally induced stress and tends to concentrate the stresses in regions where flexures are formed.

As shown in FIG. 19, according to one embodiment, the hinges 58' and 60' in are split into two separate hinges. In this embodiment, the coordination of movement among linkage and masses is improved by providing more stability against undesirable motions such as rotation about the Y axis. In addition, although flexures, 32 are depicted as a single beam, a plurality of beams offering the same compliance as a single beam may also be used to provide additional stability against undesirable motion.

Figure 20:
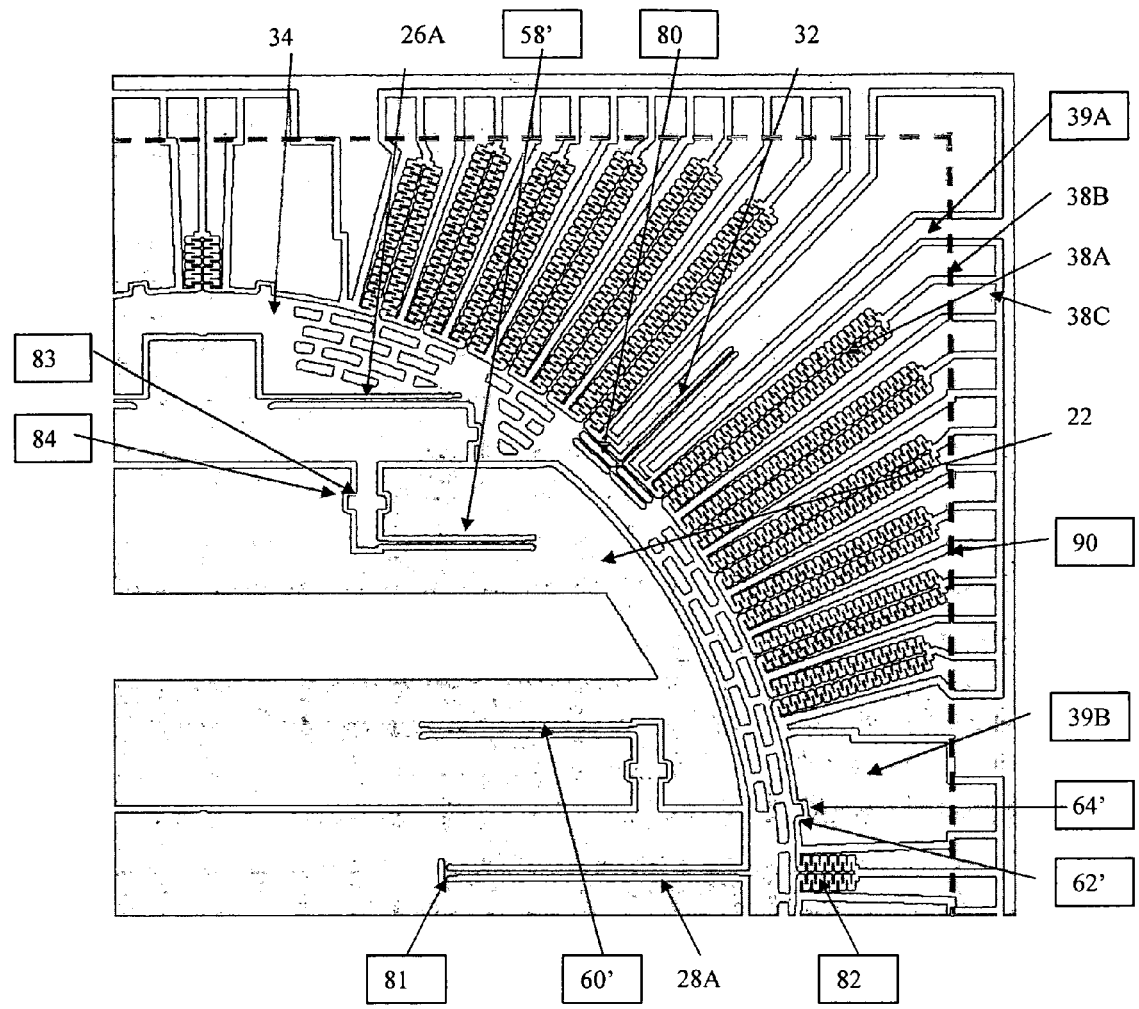
FIG. 20 illustrates an enlarged view of a portion of the gyroscope wafer of FIG. 19.

FIG. 20 is an enlarged view of a portion of the gyroscope wafer of FIG. 19 to further illustrate features of the current invention. Provided below is a listing of designations as illustrated in FIG. 20

26A torsional hinges
28A torsional hinges
32 spring
38A electrode
38B electrode to sense displacement change capacitively
38C electrode to sense displacement change differentially from 38B
39 Structure in base layer which may be at a different potential from electrodes 38B, 38C and 38A with all connecting masses 22, 24 linkages, and frame
58' split flexure
60' split flexure
62' tab on frame
64' slot/groove on base (note complementary to that of 62 and 64)
80 stress isolation for flexure defining frame resonant mode
81 stress isolation for axially constrained flexure to relax beam from in-situ thermal processes during fabrication
82 structure to actuate frame in it resonant mode
83 tab in drive assembly
84 groove in drive assembly The frame tab 62' shown in FIG. 20 is engaged with a base groove 64'. In one embodiment, base groove 64' is larger that the width of frame tab 62' so that frame 34 can only rotate within a certain selected range relative to base 36 before frame tab 62' collides with a wall of base groove 64'. This selected range of motion is chosen to ensure that flexure 32 is not damaged by motion within the selected range. In this manner, the combination of tab 62' and groove 64' provides protection for flexure 32.

The hinge tab 83 shown in FIG. 20 is engaged with a mass groove 84. In one embodiment, mass groove 84 is larger than the width of hinge tab 83 so that the mass 22 can only translate within a certain selected range before hinge tab 83 collides with a wall of mass groove 84. This selected range is chosen to ensure that flexures 26A, 28A, 58' and 60' are not damaged by motion within the selected range. In this manner, the combination of tab 83 and groove 84 provides protection for flexures 26A, 28A, 58' and 60'. Similarly hinge tab 83 can have the form of a groove and mass groove 84 have the form of a tab. In this manner the tab and groove provides similar protection for flexures 26A, 28A, 58' and 60'.

Figure 21:
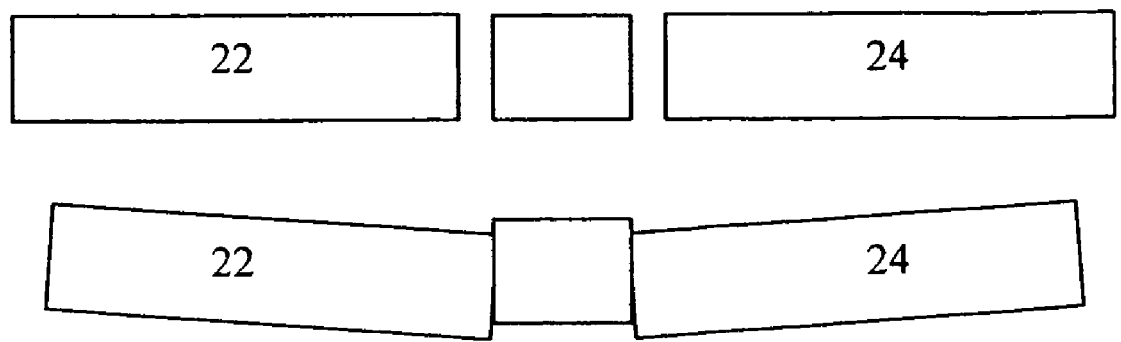
FIG. 21 schematically illustrates interference that helps to limit motion of mechanical elements of a gyroscope according to one embodiment.

In the presence of very large accelerations as seen during instances of shock, survivability of the mechanical structure is critical. Tabs 62' and 83 along with grooves 64' and 84 protect structures that are prone to breakage by selecting a range of allowable motion. These motions may be induced by in-plane and out of plane accelerations imposing inertial forces on the mass of the structure. In the presence of z acceleration, the predominant inertial forces act on the substantial masses 22 and 24. The linkages and hinges 54, 58, 60 and torsional hinges 26A, 28A, and 30A are designed such that the resultant motion of the masses due to Z-acceleration is not purely in the Z-direction. The masses 22 and 24 are designed to rotate about the X-axis and translate in the Y-direction. By selecting the proper gap size between gyroscope wafer structures with respect to the thickness of the gyroscope wafer and the rotation of the masses about the X-axis, the motion induced by Z-acceleration can be limited. FIG. 21 schematically illustrates the interference that helps limits the motion and protects the mechanical elements of the gyroscope wafer 20.

Operation

The embodiment of FIGS. 1 and 2 has two modes of operation. In a first and preferred mode of operation, masses 22 and 24 are driven into oscillation and the motion of frame 34 is sensed to measure Y-directed angular velocity. In a second mode of operation, frame 34 is driven into oscillation and the motion of masses 22 and 24 is sensed to measure Y-directed angular velocity. These two methods will be considered in turn.

The first preferred mode of operation includes an actuator for driving the linkage into oscillation. In the embodiment of FIGS. 1 and 2, an electrostatic actuator is provided by electrodes 48A, 48B, 50A, 50B, 52A and 52B of FIG. 2. Electrodes 48A, 48B, 50A, 50B, 52A and 52B interact with plates 30, 28 and 26 via an electrostatic interaction, where the force increases as the potential difference between the electrode and the corresponding plate increases. Plates 26, 28 and 30 are typically held at the same electric potential, which can be taken to be the zero reference for electric potential without loss of generality.

Electrodes 48A, 48B, 50A, 50B, 52A and 52B are preferably split electrodes, as shown on FIG. 2. The main reason for this is that the electrostatic interaction between a plate and an electrode tends to be an attraction (instead of a repulsion), so to provide torques in either direction, an electrode element on either side of the rotation axis is required, as shown on FIG. 2. The gap between electrodes 48A, 48B, 50A, 50B, 52A and 52B, and the corresponding plates (30, 28 and 26 respectively) is preferably precisely controlled in fabrication to a pre-determined gap height d, to reduce the voltage required to obtain a given rotation of the plates as much as possible, while still providing adequate clearance for the movement of the plates by the actuators. Electrodes 48A, 48B, 50A, 50B, 52A and 52B are preferably electrically driven in a cooperative manner to excite an oscillation mode of the linkage formed by masses 22 and 24, and plates 26, 28, and 30 having oscillation of masses 22 and 24, substantially out of phase with each other, in the Z direction (i.e., out of plane direction). The linkage motion corresponding to this oscillation mode is schematically shown on FIGS. 11a and 11b.

It is also preferable for plate 26 to include a lever arm extending toward mass 22, for plate 30 to include a lever arm extending toward mass 24, and for plate 28 to include lever arms extending toward both mass 22 and mass 24, all as shown on FIG. 1. As a result of the lever arms extending from plates 26, 28 and 30, the distance between the flexure hinges (54, 56, 58, 60) and the axes of plate rotation (26B, 28B, 30B) is increased, which increases the displacement of masses 22 and 24 provided by a given rotation of the plates. Such increased displacement is highly desirable for improving gyroscope performance and/or for providing a desired level of performance at a lower cost. To accommodate the increased travel of masses 22 and 24, recesses 45 and 47 are formed in reference wafer 44 beneath masses 22 and 24, respectively. Cap wafer 42 is also configured to allow sufficient room to accommodate all moving parts of gyroscope wafer 20, and can also include recesses (not shown).

When gyroscope wafer 20 is rotated about the Y axis with angular velocity $\Omega_y$, masses 22 and 24 experience oscillating X-directed Coriolis forces in the reference frame of gyroscope wafer 20. The Coriolis forces on masses 22 and 24 are oppositely directed along the X axis, since the two masses are moving in opposite directions along the Z axis. The Coriolis forces on masses 22 and 24 induce an oscillatory torque on frame 34 about the Z axis, which sets frame 34 into angular oscillation. Since the amplitude of the angular oscillation of frame 34 depends on $\Omega_y$ (ideally it is proportional to $\Omega_y$) measuring this amplitude provides a measurement of the angular velocity $\Omega_y$.

In order to improve gyroscope sensitivity, it is preferable to exploit mechanical resonances of the gyroscope structure. Accordingly, it is preferable to drive the linkage containing masses 22 and 24 at a frequency which is equal or about equal to the fundamental linkage resonant mode frequency. Preferably, the fundamental linkage resonant mode (i.e., the mechanical mode having lowest frequency) will correspond to antiphase oscillation of masses 22 and 24 as shown in FIGS. 11a and 11b. Such correspondence can be ensured during design of the linkage and its supporting flexures. By selecting a driving frequency at or near the linkage natural frequency, the motion of the linkage provided by a given actuator force is increased.

It is also preferable to ensure that the fundamental frame resonant mode corresponds to rigid body angular oscillation of frame 34 about the Z axis, which can be done by suitable design of frame 34 and flexures 32. Furthermore, it is preferable for the frame fundamental frequency to be greater than the linkage fundamental frequency. This ensures that the drive frequency is closer in frequency to the fundamental mode of frame 34 than to any other resonant mode of frame 34, thereby minimizing the excitation of higher order mechanical modes of frame 34 which can interfere with gyroscope operation.

In this embodiment, the angular oscillation amplitude of frame 34 is sensed with a transducer. Preferably, the transducer is a capacitive sensor disposed between and connected to frame 34 and base 36. Two suitable electrode configurations for such a capacitive sensor are shown on FIG. 5. The configuration shown as 38A, 38B and 38C on FIG. 5 is referred to as a tree configuration, while the configuration shown as 40A, 40B and 40C on FIG. 5 is referred to as a radial configuration. With respect to a rectangular configuration, the transducers can be located along a perimeter of a cavity edge 90 as shown in 20.

In the tree configuration, electrodes 38A are attached to and move with frame 34, while electrodes 38B and 38C are both attached to base 36 and do not move with frame 34. The "unit local cell" consisting of one electrode 38A, one electrode 38B and one electrode 38C can be repeated as desired in the region between frame 34 and base 36. Two such "unit local cells" are shown on FIG. 5. Referring to FIG. 20, a plurality of "unit local cells" 38A, 38B, and 38C is shown. In one embodiment, all movable structures including masses 22, 24, springs 32, frame 34 and electrode 38A are mechanically connected and formed from bulk silicon. This collective group of elements shares the same electrical potential. Accordingly, electrical potential shields 39A and 39B (as shown in FIG. 20) can be located in areas to shield sensitive electrodes 38B and 38C. The shield 39A is protects the electrodes 38B and 38C from electromagnetic interference (EMI). An electrical potential substantially equal to that of all movable structures minimizes electrostatic forces that may act on the movable structures in a non-desirable manner. Similarly, shields comprising of a planar structure may be patterned on both the reference wafer 44 and cap wafer 42 to protect from electromagnetic and electrostatic disturbances.

Referring back to FIG. 5, electrically, all electrodes 38A are connected to each other, all electrodes 38B are connected to each other, and all electrodes 38C are connected to each other. Thus two capacitors are formed: capacitor AB between electrodes 38A and 38B, and capacitor AC between electrodes 38A and 38C. Such an arrangement, where electrodes 38B are not connected to electrodes 38C, is known as a split-finger configuration. Since motion of frame 34 changes the capacitance of capacitors AB and AC, measuring these capacitances with circuitry provides sensing of motion of frame 34. Electrode 38A is comprised of the frame 34 which is displaced rotationally about the axis perpendicular to the surface. In the "unit local cell" the close proximity of the 38B and 38C minimizes the area where unequal parasitic capacitances may compromise the detection. The area that bounds the localized differential pair is less than that of the thickness of the gyro wafer 20. Such circuitry is preferably located on reference wafer 44.

Similarly, in the radial configuration, electrodes 40A are attached to and move with frame 34, while electrodes 40B and 40C are attached to base 36 and do not move with frame 34. Again, two capacitors are formed, and measuring these capacitances with circuitry (preferably located on reference wafer 44) provides sensing of motion of frame 34.

Referring to FIG. 20, a structure 82 is shown that can be used to actuate the rotation of frame 34 during a self-test mode of operation. This capability allows the sense mode frequency to be measured for characterization and quality assurance measurements. The application of a known electrical signal introduces a calculated torque on the ring causing the ring to displace rotationally about the axis normal to the base. This displacement simulated the rotation caused by the torque generated form the masses that are acted on be the Coriolis force due to angular velocity. The motion (or displacement) of the ring is used for characterization of the sense mode frequency to calibrate one or more sensors. In one embodiment, one or more actuators are used to displace the sing during the self-test mode of operation. The actuators can be electrostatic actuators configured according to the configurations discussed above in connection with FIG. 5. For example, the electrostatic actuators can utilize a comb finger (or split-finger) electrode configuration, or a parallel plate electrode configuration.

In a second mode of operation, frame 34 is driven into angular oscillation about the Z axis, which entails antiphase oscillation of masses 22 and 24 along the X axis. When gyroscope wafer 20 is rotated about the Y axis with angular velocity $\Omega_y$, the oscillation of frame 34 induces oscillating Z-directed Coriolis forces on masses 22 and 24, which set the linkage including masses 22 and 24 into oscillation. Since the amplitude of the oscillation of the linkage depends on $\Omega_y$ (ideally it is proportional to $\Omega_y$) measuring this amplitude provides a measurement of the angular velocity $\Omega_y$.

Since this second mode of operation is similar to the first preferred mode of operation, the above discussion is applicable with the following differences:

1) The second operation mode includes an actuator for driving frame 34 into angular oscillation. An electrostatic actuator connected to frame 34 and base 36 is one suitable means for driving frame 34 into angular oscillation. Such an electrostatic actuator may have various electrode configurations, including the configurations of FIG. 5.

2) In the second operation mode, it is preferable to drive the frame at or near its fundamental resonance frequency, and it is preferable for the linkage fundamental frequency to be greater than the frame fundamental frequency.

3) The second operation mode includes a transducer for sensing oscillation of the linkage. A capacitive sensor connected to the linkage is a suitable transducer. Electrodes 48A, 48B, 50A, 50B, 52A and 52B on FIG. 2 provide such a capacitive sensor. Motion of plate 26 above electrodes 52A and 52B is sensed by measuring capacitance between electrode 52A and plate 26, and measuring capacitance between electrode 52B and plate 26. Motion of plates 28 and 30 is sensed similarly.

In both modes of operation, angular velocity sensors according to an embodiment of the invention advantageously reduce errors induced by any linear acceleration the sensor may be subjected to. In the first operation mode, the motion that is sensed is an angular oscillation of frame 34, and linear acceleration of the sensor does not tend to induce such a motion. In the second operation mode, the motion that is sensed is an antiphase oscillation of masses 22 and 24, and here also the sensed motion is not a motion that linear acceleration tends to induce. For example, linear Z directed acceleration tends to induce in-phase (as opposed to antiphase) oscillation of masses 22 and 24.

Fabrication

In a preferred embodiment, an angular rotation sensor (or gyroscope) having the structure and operation discussed above is fabricated with micromachining technology (also known as MEMS technology). Two forms of MEMS technology are known: bulk MEMS and surface MEMS. Bulk MEMS technology is preferable for the present invention, because bulk MEMS proof masses (i.e. masses 22 and 24) can have greater mass and can have a larger range of motion than surface MEMS proof masses. FIGS. 7a-d, 8a-d, 9a,b and 10a,b schematically show an exemplary fabrication sequence suitable for fabricating an embodiment of the invention.

FIGS. 7a-d schematically show a sequence of steps suitable for fabricating cap wafer 42. On FIG. 7a, cap wafer 42 is patterned with backside alignment marks 72. Alignment marks 72 can be made using reactive ion etching (RIE). In passing from FIG. 7a to FIG. 7b, the surface of cap wafer 42 facing away from alignment marks 72 is cleaned, and then thermally oxidized, to generate an oxide layer 70. Oxide layer 70 is preferably about 0.5 microns thick, and can be made by heating cap wafer 42 to a high temperature (e.g., greater than 1000 C) in a water-containing ambient environment. In passing from FIG. 7b to FIG. 7c, oxide layer 70 is lithographically patterned, as schematically shown on FIG. 7c. In passing from FIG. 7c to 7d, material of cap wafer 42 not protected by oxide layer 70 is etched away to a depth of about 100 microns. Deep RIE (DRIE) is a suitable etch method for this step. In general, material not protected by oxide layer 70 may be etched by various techniques including, for example, reactive ion etching using a plasma or by wet chemical etching. The preferred method for high volume low cost fabrication is for a batch oriented processes such as wet chemical etching. At this point in the process, cap wafer 42 has the configuration shown in FIG. 2. After the etch, cap wafer 42 is cleaned in preparation for a fusion bond. Suitable cleaning steps include a high temperature (e.g., >300 C) ashing step and a sulfuric peroxide dip. The cleaning methods employed must leave patterned oxide layer 70 intact.

Figure 7A:
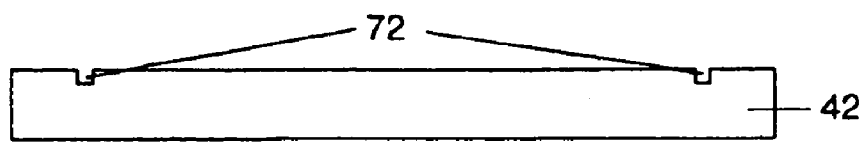
FIGS. 7a, 7b, 7c, 7d, 7e, and 7f schematically show processing steps for making a cap wafer according to an embodiment of the invention.
Figure 7B:
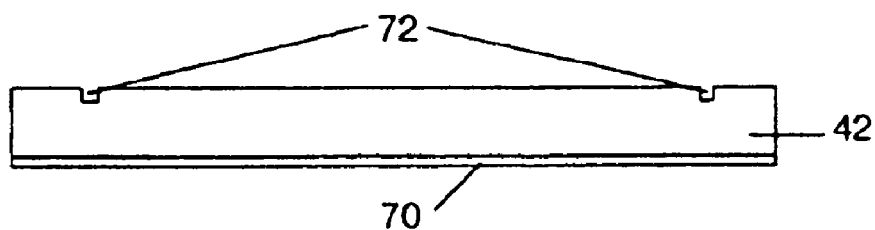
Figure 7C:
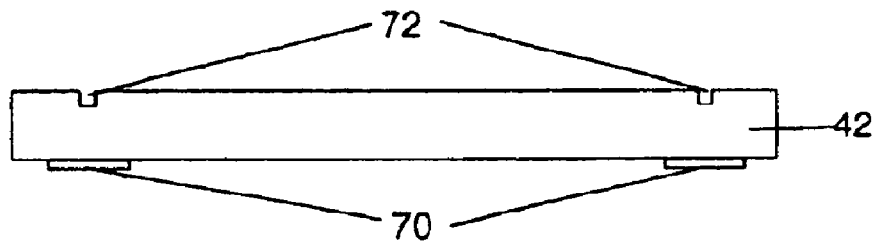
Figure 7D:
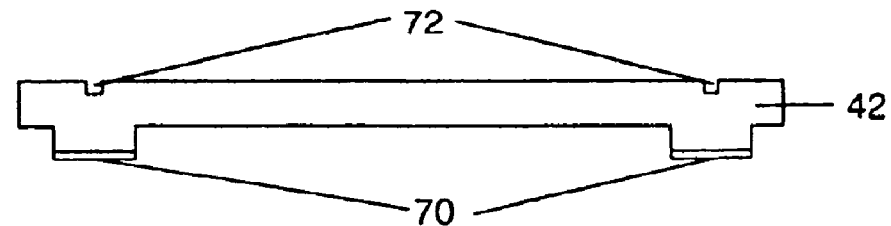
Figure 7E:
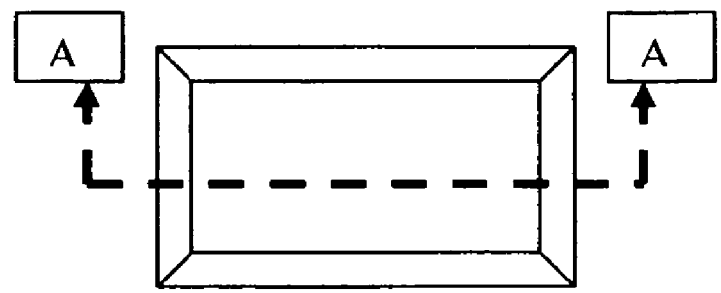
Figure 7F:
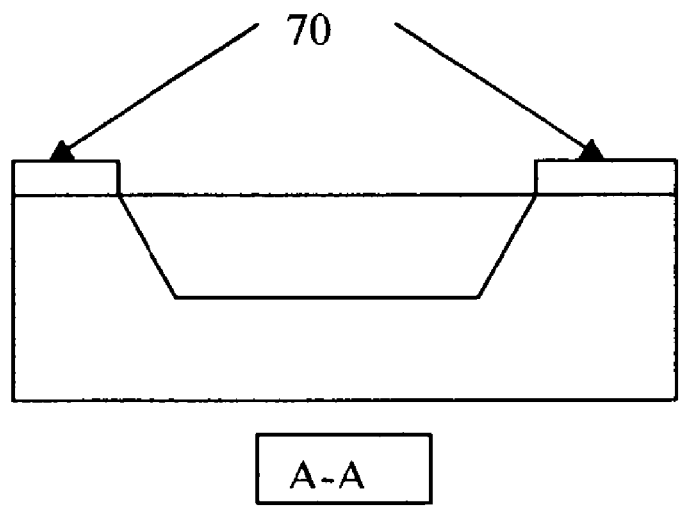

FIGS. 7e-f illustrates the silicon etching characteristics on a silicon cap wafer using wet chemicals. FIG. 7e illustrates a plan view of a silicon cap wafer. FIG. 7f illustrates a cross section view of the silicon cap wafer of FIG. 7e along line A-A. Preferential etching occurs along certain crystallographic planes. A substantially rectangular shape opening in the silicon cap wafer enables a low cost high throughput for the fabrication of silicon cap wafers. In one embodiment, the recess (or opening) in the silicon cap wafer provides two functions. First, the presence of the recess defines where the free standing subassemblies are allowed to move. Second, the depth of the recess accommodates motion of the proof masses of the gyroscope. Wet chemistries such as EDP, KOH and TMAH are common etchants with the characteristic crystal dependent etch. In one embodiment, edges that are parallel and perpendicular to the flat edge of the silicon cap wafer with a crystal designation of <100> will exhibit well controlled edges with a tapered edge emitting from the edge.

FIGS. 8a-d schematically show a sequence of processing steps suitable for fabricating gyroscope wafer 20. Gyroscope wafer 20 is preferably a prime low total thickness variation (TTV) wafer. Gyroscope wafer 20 is cleaned with a sulfuric peroxide dip and is then fusion bonded to patterned oxide layer 70 on cap wafer 42, as shown on FIG. 8a. In the processing sequence of FIGS. 7-10, the bonding of cap wafer 42 to gyroscope wafer 20 occurs in an earlier stage of processing than the bonding of reference wafer 44 to gyroscope wafer 20. Accordingly, relatively high temperature bonding processes are preferred for bonding cap wafer 42 to gyroscope wafer 20, including but not limited to: eutectic metal bonding, glass bonding, solder bonding, Gold eutectic bonding, Si to $SiO_2$ fusion bonding and Si to Si fusion bonding. In passing from FIG. 8a to FIG. 8b, gyroscope wafer 20 is thinned from typically about 500 microns thickness to about 40 microns thickness. Conventional grinding and polishing is a suitable method for performing this thinning step. The thinning of gyroscope wafer 20 can be done uniformly, or it can be done so that regions of gyroscope wafer 20 that will become masses 22 and 24 are thicker than other parts of gyroscope wafer 20. Such increased thickness is beneficial because it increases the masses of masses 22 and 24.

Figure 8A:
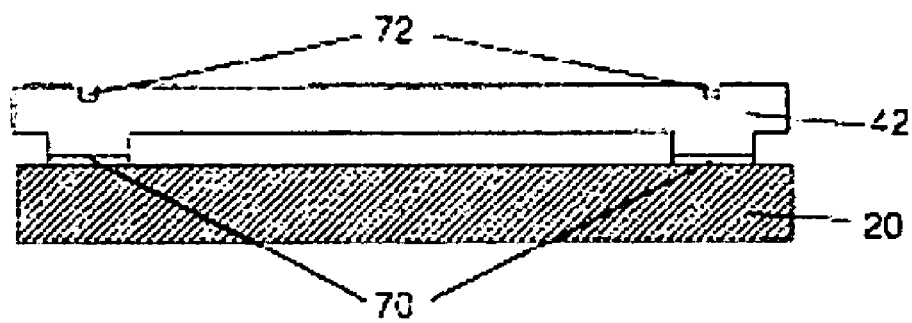
FIGS. 8a, 8b, 8c, and 8d schematically show processing steps for making an assembly of a cap wafer and a gyroscope wafer according to an embodiment of the invention.
Figure 8B:
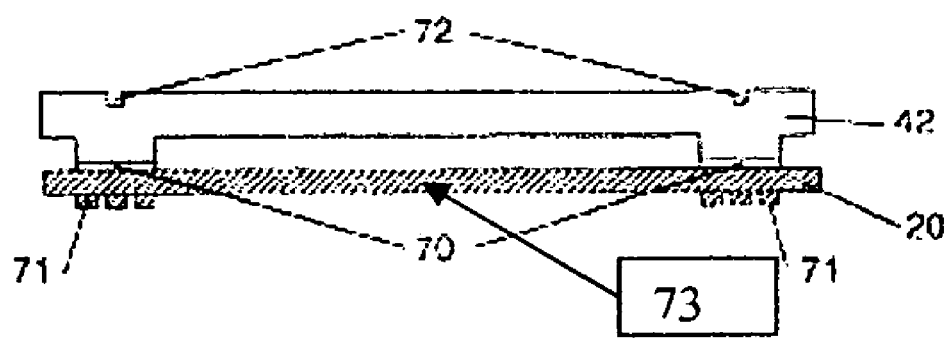
Figures 18A, 18B:
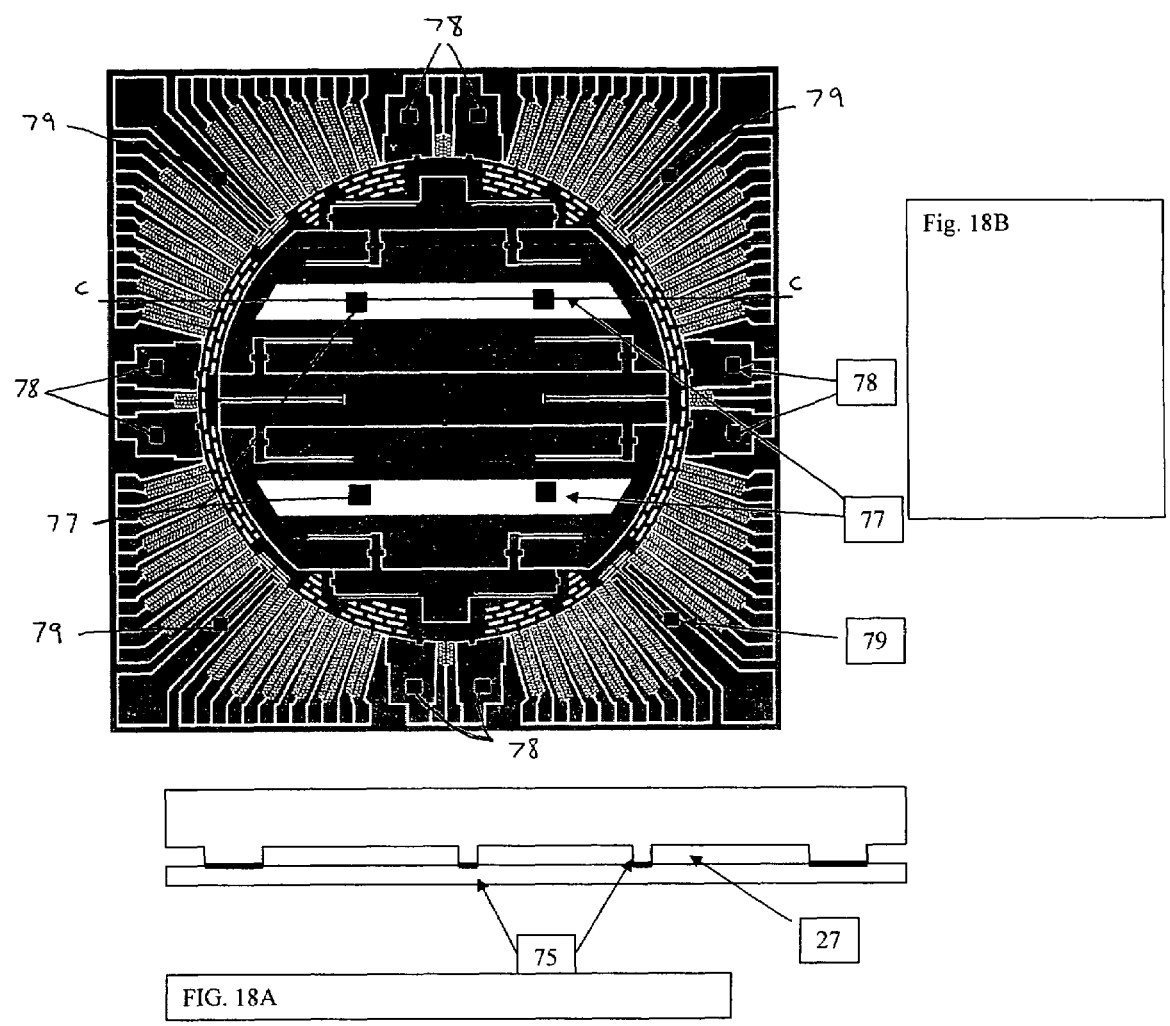
FIGS. 18a and 18b illustrate cross-sectional and plan views, respectively, of a gyroscope wafer including posts according to one embodiment of the invention.

In one embodiment, the masses 22 and 24 and other gyro structure components-including flexures 32, plates 26, 28, 30 and frame 34—are suspended from the base 36 in a membrane region 73 as shown in FIG. 8b. Referring to FIGS. 18a and 18b, cross sectional and plan views, respectively, of the gyroscope wafer are shown. Specifically, FIG. 18a illustrates a cross section view of the gyroscope wafer of FIG. 18b along line C-C.

As shown in FIG. 18a, according to one embodiment, posts 75 are located in the membrane region 73. The posts 75 within the substantially rectangular recess (of the silicon cap wafer) improve the uniformity of the thinning process of gyroscope wafer 20. The thinning process may involve grinding and polishing which may apply a vertical force on the membrane region 73 during the thinning process. As a result, an undesirable thickness variation across the membrane region 73 can result due to the membrane region 73 not being supported. As shown in FIG. 18b, in one embodiment, to improve the uniformity across critical areas such as the masses 22 and 24, releasable posts 77 are used to support structures such as masses 22 and 24. The fabrication of the posts 75, 77 can occur during the formation of the recess 27 in the cap wafer 42. Posts 75, 77 are realized by areas within the recess 27 protected by oxide layer 70. The posts provide mechanical support during the thinning process and during the final assembly of gyroscope wafer 20 reference wafer 44 and cap wafer 42. The posts 75, 77 may also act as base flexure mounts 66 that may be located in the interior of the recess 27 as well as on the base on the perimeter edge of the recess 27. In one implementation, posts 78 are included to support wafer level integration of a reference wafer associated with a dual-axis sensor, in which the reference wafer forms a lower portion of a single hermetic seal within the dual-axis sensor. Further, the dual-axis sensor can further include posts 79 that provide a base or anchor within the cavity of the dual-axis sensor from which the frame (e.g., frame 34) is suspended.

Referring back to FIG. 8b, after gyroscope wafer 20 is thinned, standoffs 71 shown on FIG. 8b are formed by lithographic patterning followed by an etch. A KOH etch is suitable for this step. The purpose of standoffs 71 is to precisely determine the vertical separation d between actuator electrodes such as electrodes 48A,B, 50A,B and 52A,B on FIG. 2 from the corresponding plates (i.e., plates 30, 28 and 26 respectively).

Figure 8C:
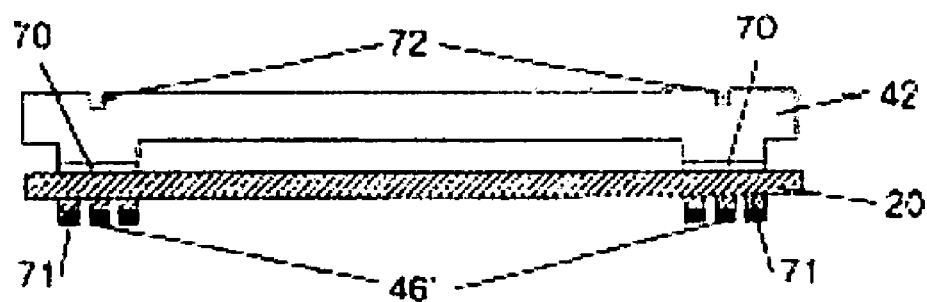

In passing from FIG. 8*b* to FIG. 8*c*, a patterned layer 46' is deposited on gyroscope wafer 20. Preferably, patterned layer 46' is a Ge layer which is deposited and then patterned (e.g., by lithography followed by an etch). Preferably, patterned layer 46' also defines electrodes between frame 34 and base 36, which can be of the types shown in FIG. 5. Alternatively, electrodes between frame 34 and base 36 can be formed in a separate processing step from deposition of patterned layer 46'.

Figure 8D:
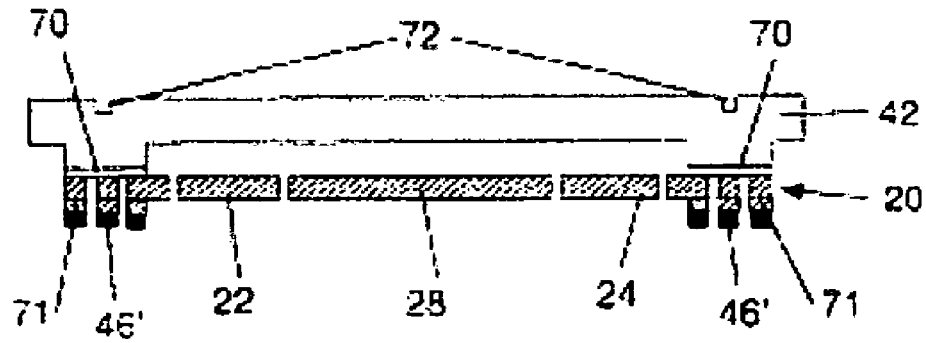

In passing from FIG. 8*c* to FIG. 8*d*, the mechanical elements of gyroscope wafer 20 are formed by etching through gyroscope wafer 20. The pattern to be etched can be formed photolithographically. A 2 micron line width and 2 micron spacing is suitable for this etch, which stops on oxide layer 70. Deep RIE with Silicon-on-insulator (SOI) anti-footing enhancement is a suitable etch method for this step. It is preferable for this etching to be performed with an etching process suitable for creating high-aspect ratio features. After the etch of FIG. 8*d* has been performed, all of the mechanical elements of gyroscope wafer 20, shown on FIGS. 1-4 and FIG. 6, are formed. These elements include masses 22 and 24, plates 26, 28, and 30, flexures 32, frame 34, and hinges 26A, 28A, 30A, 54, 56, 58 and 60. For simplicity, FIG. 8*d* only shows plate 28 and masses 22 and 24.

Figure 9A:
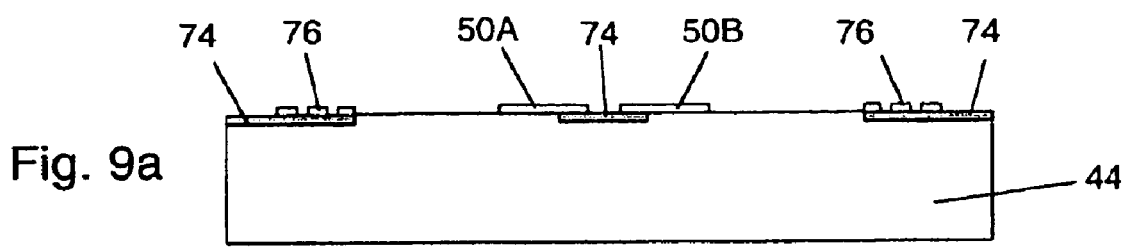
FIGS. 9a and 9b schematically show processing steps for making a reference wafer according to an embodiment of the invention.
Figure 9B:
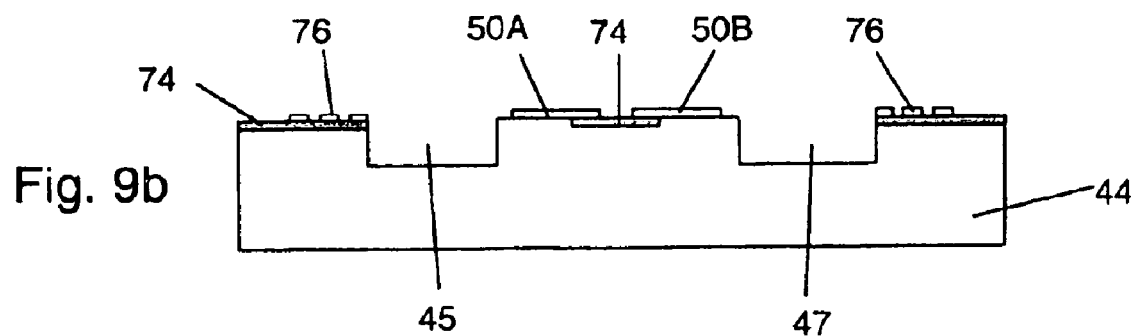

FIGS. 9*a-b* schematically show a sequence of processing steps suitable for fabricating reference wafer 44. On FIG. 9*a*, the active areas of reference wafer 44 are schematically indicated as 74. Active areas 74 include regions that will make electrical contact with gyroscope wafer 20, as well as circuitry for driving gyroscope wafer 20 and circuitry for sensing output signals provided by gyroscope wafer 20. Such circuitry is preferably conventional Silicon CMOS circuitry. In the preferred embodiment, the last layer of metal deposited in the conventional CMOS process is a metal layer suitable for use as a bond metal. This upper layer of metal also defines the electrodes 48A,B, 50A,B and 52A,B (only electrodes 50A,B are shown on FIG. 9*b*), and bond pads 76, schematically shown on FIG. 9*a*. In passing from FIG. 9*a* to FIG. 9*b*, recesses 45 and 47 are formed in reference wafer 44. Recesses 45 and 47 are preferably fabricated with DRIE, to a depth of about 100 microns.

Figure 10A:
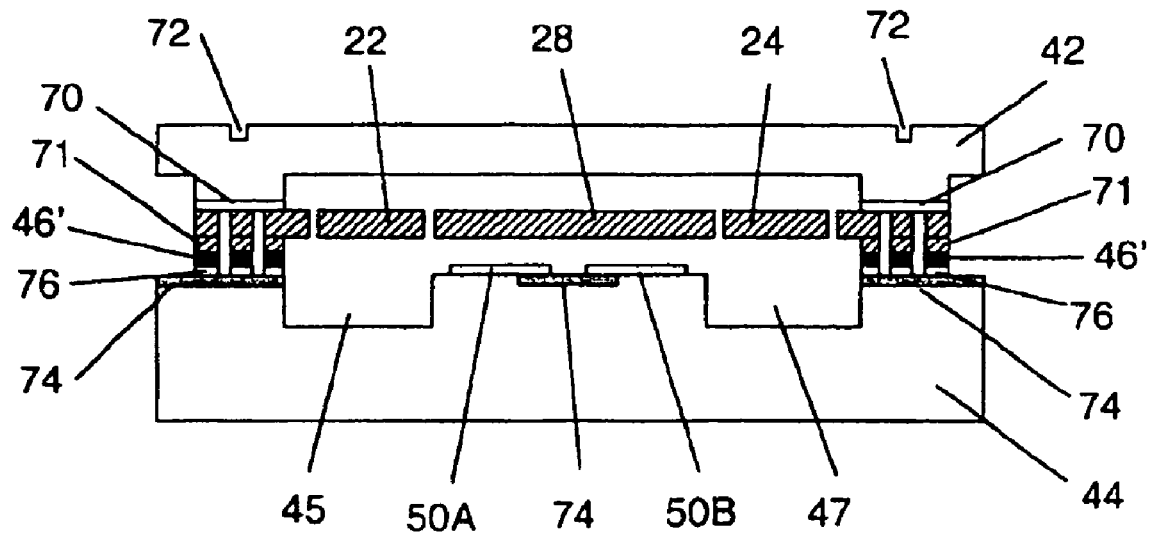
FIGS. 10a and 10b schematically show processing steps for making an assembly of cap wafer, gyroscope wafer and reference wafer according to an embodiment of the invention.
Figure 10B:
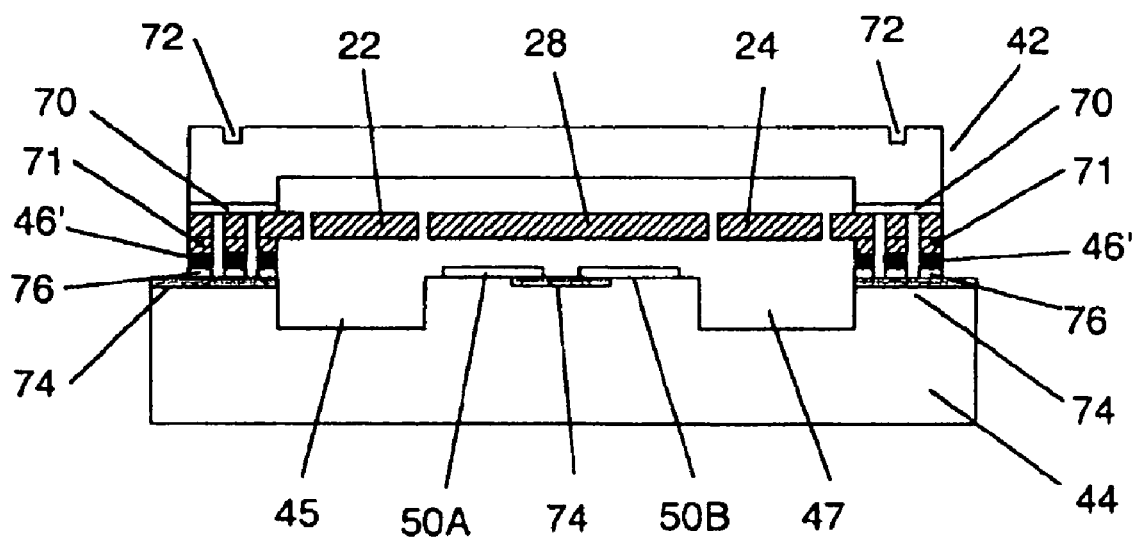

FIGS. 10*a-b* schematically show a sequence of processing steps suitable for final assembly of gyroscope wafer 20, reference wafer 44 and cap wafer 42. On FIG. 10*a*, reference wafer 44 is shown attached to gyroscope wafer 20 via an aligned metal to metal bond between patterned layer 46' on gyroscope wafer 20, and bond pads 76 on reference wafer 44. In the processing sequence of FIGS. 7-10, the bonding of reference wafer 44 to gyroscope wafer 20 occurs in a later stage of processing than the bonding of cap wafer 42 to gyroscope wafer 20. Accordingly, relatively low temperature bonding processes are preferred for bonding reference wafer 44 to gyroscope wafer 20, including but not limited to: eutectic metal bonding, Aluminum-Germanium bonding, solder bonding, Indium-Gold bonding, and polymer bonding.

The separation d between plate 28 and electrodes 50A and 50B on FIG. 10*a* is determined by the combined thickness of standoffs 71 and patterned layer 46', and can be precisely controlled (or predetermined) by selecting the height of standoffs 71. The separation between other electrodes (e.g., electrodes 48A,B and electrodes 52A,B) and their corresponding plates (e.g., plates 30 and 26 respectively) is also determined in the same way, and typically the same predetermined distance d separates all plates from their corresponding electrodes. Although the processing sequence of FIGS. 7-10 shows standoffs 71 being formed exclusively on gyroscope wafer 20, it is also possible to form standoffs exclusively on reference wafer 44, or on both gyroscope wafer 20 and reference wafer 44 in order to define the separation between plates and electrodes. In passing from FIG. 10*a* to FIG. 10*b*, material is etched away from cap wafer 42 to allow access to active areas 74 from above. This etch can be done with DRIE. By allowing access to active areas 74 from above, electrical connection to the angular velocity sensor of FIG. 10*b* is facilitated.

Reference wafer 44 is preferably attached to gyroscope wafer 20 via a metal-to-metal bond, which can be made hermetic. Likewise, gyroscope wafer 20 is preferably attached to cap wafer 42 by a fusion bond, which can also be made hermetic. As a result, the entire assembly of reference wafer 44, gyroscope wafer 20 and cap wafer 42 can provide a hermetic barrier between gyroscope elements (such as masses 22 and 24) and an ambient environment.

In order to meet some performance specifications of different markets for the gyroscope, it is advantageous, in some cases, to provide a reduced pressure (e.g., about 1 mTorr, which is substantially less than atmospheric pressure) within the enclosure provided by the hermetic barrier. In this manner, resistance to motion of masses 22 and 24 due to air (or other gas) filling the enclosure is desirably reduced. Alternatively, holes can be provided in masses 22 and 24 (and in other moving parts of the linkage) to reduce air resistance to motion. In other cases, it may be desirable to provide a pressure within the hermetic enclosure that is greater than atmospheric pressure.

This discussion of FIGS. 7*a-d*, 8*a-d*, 9*a-b*, and 10*a-b* provides a schematic overview of an exemplary sequence of processing steps suitable for fabricating a preferred embodiment of the invention. Therefore, no single step discussed above is essential for practicing the invention. Furthermore, most of the steps discussed above can be performed using alternate methods not mentioned above, but which are well-known in the semiconductor processing art. More generally, the entire detailed description has generally been by way of example, as opposed to limitation. In the following, further examples of embodiments of the invention are briefly described.

Figure 12:
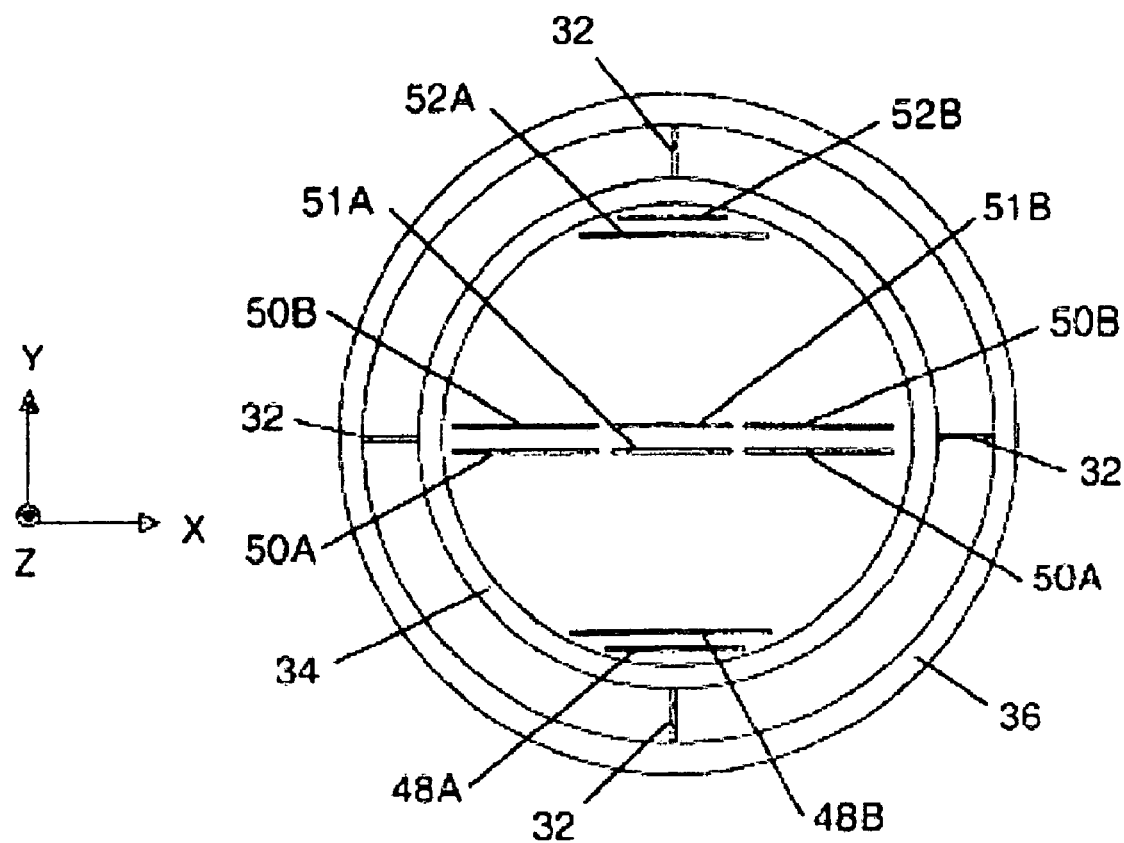
FIG. 12 schematically shows an arrangement of electrodes on a reference wafer according to an embodiment of the invention.

FIG. 12 is a schematic top view of an arrangement of electrodes on a reference wafer according to one embodiment of the invention. In the view of FIG. 12, masses 22 and 24, and plates 26, 28, and 30 are not shown, so that the electrodes beneath these elements of the linkage can be seen. In the configuration of FIG. 12, electrodes 48A,B, 50A,B and 52A,B serve to drive plates 30, 28, and 26, respectively, as described above. In addition, the configuration of FIG. 12 provides electrodes 51A and 51B for sensing motion of the masses, or more generally, motion of the linkage. The configuration of electrodes the circuitry will allow electrodes 48A and 52B to sense the motion of the linkage. The function of drive sense electrodes 51A, B are performed by 48A and 52B which would sense the rotated motion of edge plates 26 and 30. Similarly electrodes 52A and 48B can be configured in the circuitry to sense the motion of the linkage. Signals provided by electrodes 51A and 51B can be advantageously used by circuitry which drives the linkage actuators. For example, sensing the motion of the linkage in this manner allows the driving circuitry to drive the linkage precisely at its fundamental mechanical resonance frequency.

Figure 22:
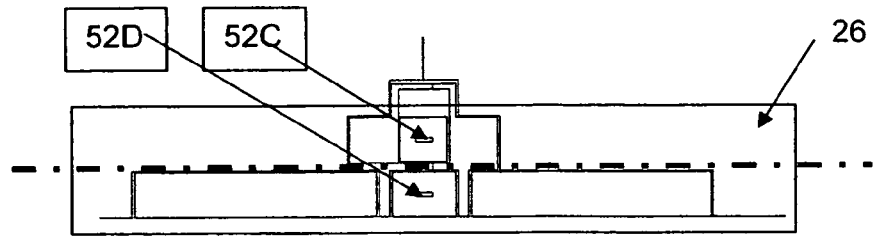
FIG. 22 illustrates a plan view of an edge plate and electrodes for sensing motion of the mass according to one embodiment of the invention.

FIG. 22 illustrates a plan view of edge plate 26 and split electrodes 52C and 52D for sensing motion of the edge plate 26 according to one embodiment of the invention. It may be preferable to reconfigure the sense electrodes as shown in FIG. 22. Compared to the configuration shown in FIG. 12, sense electrode 52B has been reconfigured into two (split) electrodes 52C and 52D. The edge plate 26 is shown to locate its relative position to the electrodes 52C, D. In this embodiment, the sense electrodes 52C and 52D are placed in a manner to provide differential sensing of the tilting edge plate 26. The relative size of the two split electrodes 52C and 52D are chosen to reject tilting motion from the frame (not shown). Consequently the signal generated from the electrode sensing is purely from the tilting of the plate. This information is then incorporated into a feedback loop to control the amplitude of the oscillation of masses 22 and 24.

Figure 23:
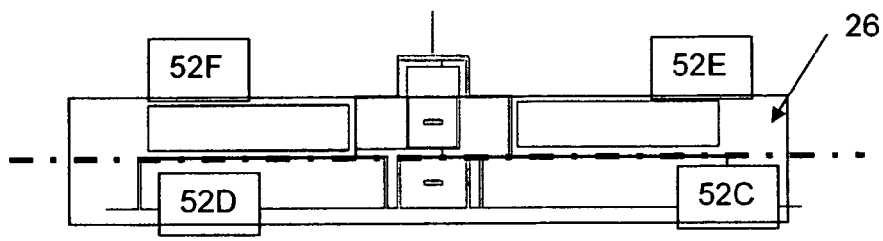
FIG. 23 illustrates a plan view of an edge plate and electrodes for sensing motion of the mass according to one embodiment of the invention.
Figure 24:
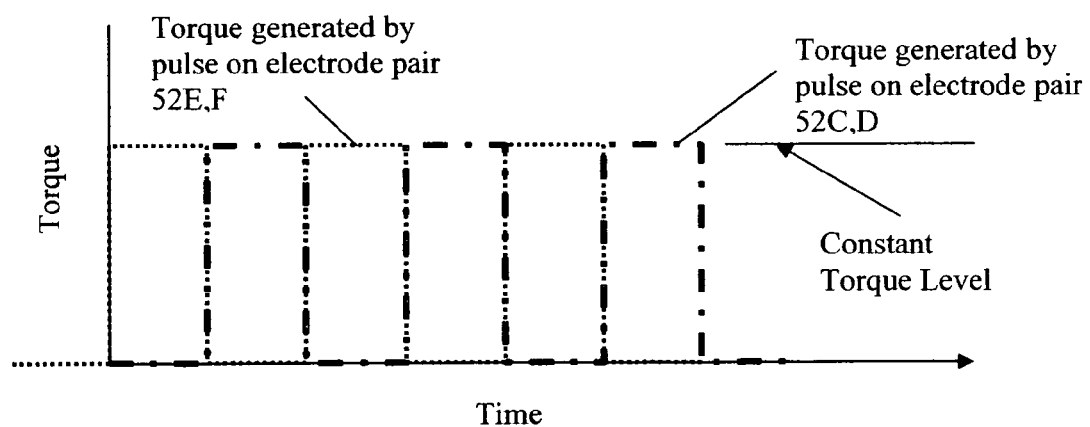
FIG. 24 illustrates a diagram of torque forces generated on an edge plate over time.

Referring back to FIG. 12, electrodes 52A and 48B may be configured to actuate the linkages by driving outside plates 26, and 30. FIG. 23 shows an embodiment where electrodes 52 C-F have replaced electrode 52A of FIG. 12. Electrodes 52C and 52D would be electrically connected. Similarly the electrode pair 52E and 52F are connected together. The objective of the split drive is to obtain a constant torque on the edge plate 26 over time. Any effect of this average constant torque over time is not observed at the drive frequency where the rate of rotation induced Coriolis forces are measured. FIG. 24 shows a diagram that illustrates the constant torque generated on the edge plate 26 which forms the two out of phase inputs to electrode pairs 52C, D and 52E, F.

Figure 13:
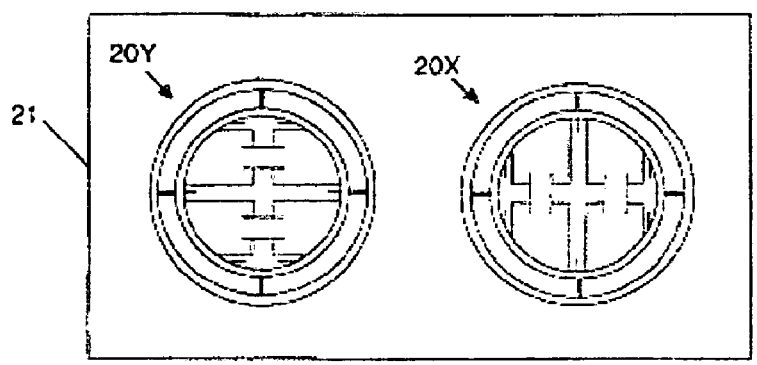
FIG. 13 schematically shows a dual-axis embodiment of the invention.

FIG. 13 schematically shows a top view of an integrated dual-axis gyroscope according to an embodiment of the present invention. In the configuration of FIG. 13, a Y-axis subsensor 20Y and an X-axis subsensor 20X are preferably fabricated on a single Silicon chip 21. Subsensors 20X and 20Y are preferably sensors as described in connection with FIGS. 1 and 2, and the configuration of FIG. 13 advantageously provides dual-axis sensing with an integrated angular velocity sensor. Such integration greatly reduces cost, compared to two non-integrated, single-axis sensors. In one embodiment, the X-axis subsensor 20X and the Y-axis subsensor 20Y are operated at separated frequencies. In this embodiment, all fundamental frequencies (4) are separated by more than 500 Hz. Each axis rate sensor has two fundamental frequencies—a drive mass mode and a frame sense mode. The dual axis gyroscope comprises two rate sensors that are in close proximity. By operating at different frequencies, crosstalk is mitigated. In addition, the dual-axis gyroscope can be hermetically sealed by a single hermetic seal ring 21. The single hermetic seal ring 21 can be formed through fabrication techniques discussed above.

Figure 17:
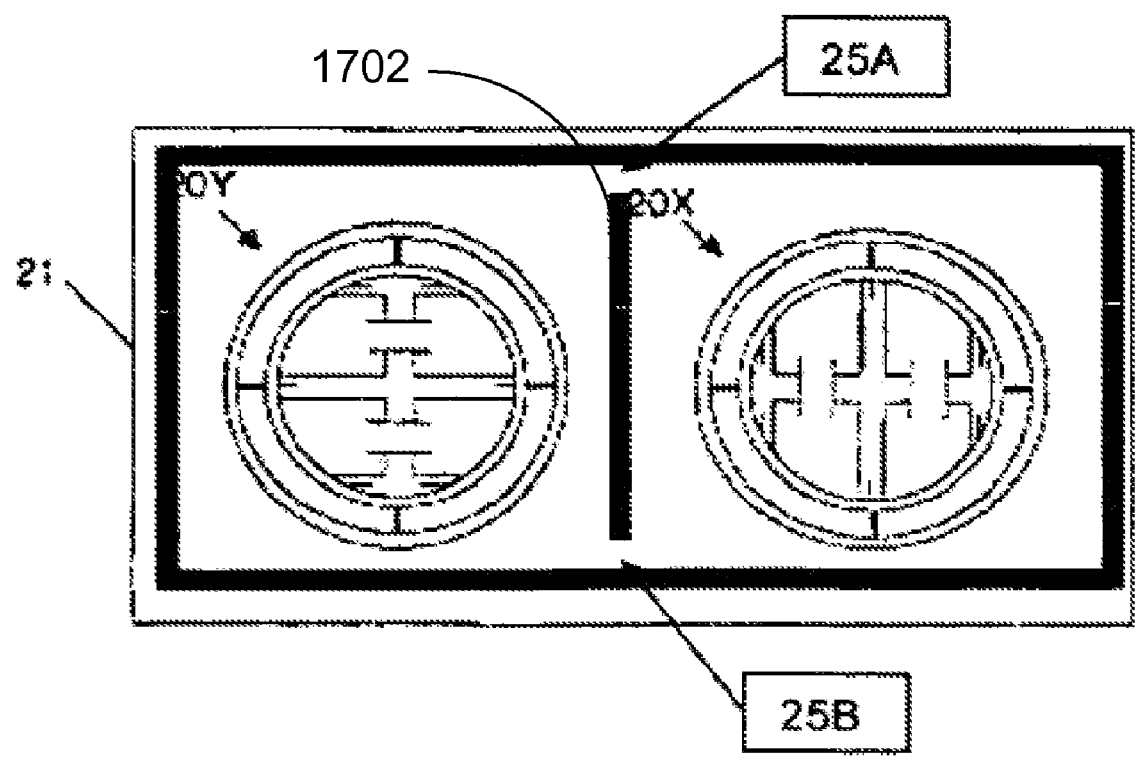
FIG. 17 schematically shows a dual-axis embodiment of the invention.

FIG. 17 illustrates another embodiment of an integrated dual-axis gyroscope 1700 according to an embodiment of the present invention. In the configuration of FIG. 17, a Y-axis subsensor 20Y and an X-axis subsensor 20X are separated by a barrier seal 1702 within the hermetically sealed enclosure provided by the single hermetic seal ring 21. The barrier seal 1702 reduces acoustic coupling from one resonating sensing element to the other—i.e., the barrier seal 1702 reduces acoustic coupling between the Y-axis subsensor 20Y and the X-axis subsensor 20X. Accordingly, the dual-axis gyroscope can have improved measurement accuracy of angular velocity. In one embodiment, channels 25A, 25B are formed within the barrier seal 1702 to permit pressure equalization on both the Y-axis subsensor 20Y and the X-axis subsensor 20X.

Figure 14A:
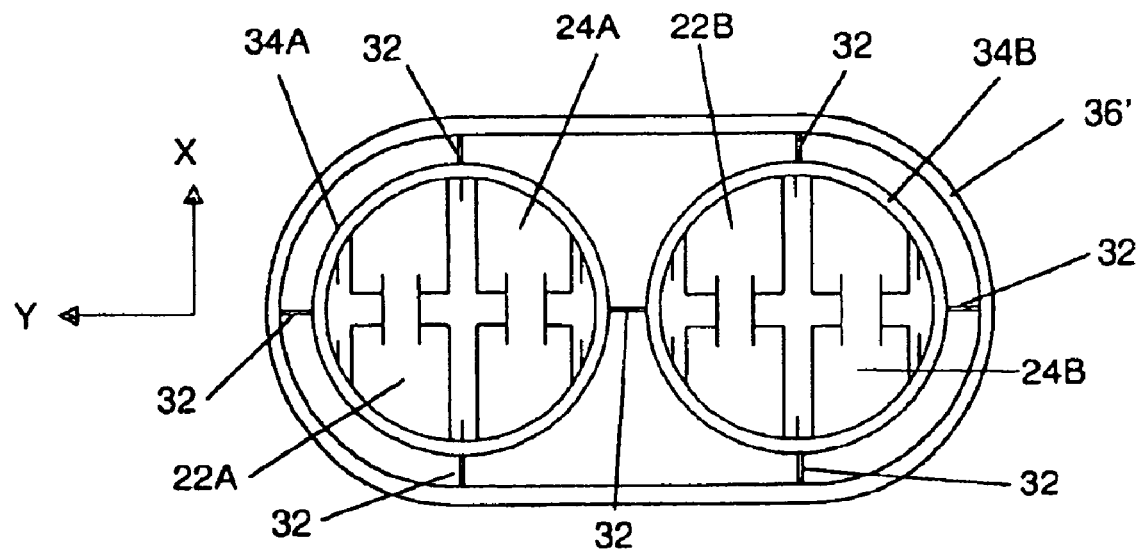
FIGS. 14a and 14b schematically show embodiments of the invention having four proof masses.
Figure 14B:
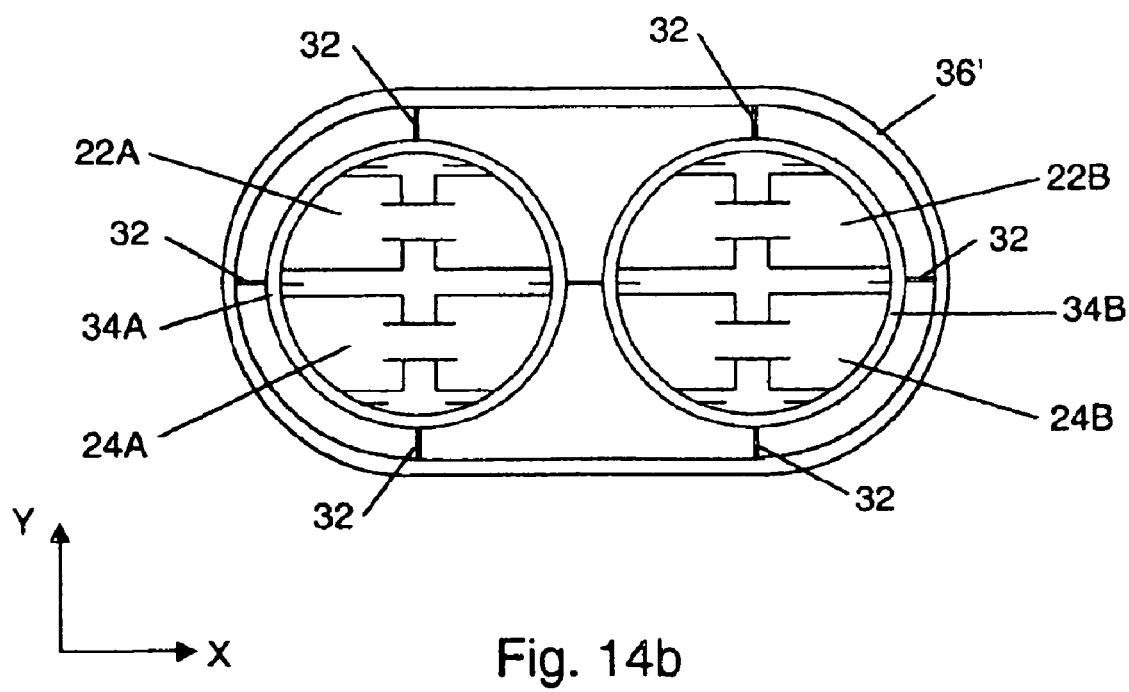

FIGS. 14a and 14b schematically show a top view of an embodiment of the invention that provides further common-mode rejection of unwanted motion. The configurations of FIGS. 14a and 14b include two frames, frame 34A and frame 34B. Masses 22A and 24A are positioned within frame 34A and masses 22B and 24B are positioned within frame 34B in much the same way that masses 22 and 24 are positioned within frame 34 on FIG. 1. Masses 22A,B and 24A,B on FIGS. 14a and 14b are driven into oscillation such that masses 24A and 22B are in phase. Masses 22A and 24A are linked to move out of phase, as are masses 22B and 24B.

Frames 34A and 34B are connected to each other by a flexure 32, and are connected to a base 36' by a plurality of flexures 32. The flexure configurations shown on FIGS. 14a and 14b are exemplary, and the invention can be practiced with other flexure configurations. The connection of frame 34A to frame 34B by flexure 32 tends to inhibit in-phase rotation of frames 34A and 34B relative to out-of-phase rotation of frames 34A and 34B because in-phase rotation of frames 34A and 34B stretches flexure 32 more than out-of-phase rotation of the same magnitude.

When the sensor of FIG. 14a is rotated about the Y axis on FIG. 14a (or the sensor of FIG. 14b is rotated about the Y axis on FIG. 14b), the Z directed torques imparted to frames 34A and 34B are out of phase. The reason for this is that the two linkages within frames 34A and 34B are moving out of phase with respect to each other. In contrast, angular acceleration of the sensors of FIGS. 14a and 14b about the Z axis causes frames 34A and 34B to rotate in phase. Thus, the sensors of FIGS. 14a and 14b can reject spurious signals due to angular acceleration about the Z axis, which is a capability the embodiment of FIG. 1 does not provide. Rotation of frames 34A and 34B on FIGS. 14a and 14b can be sensed as discussed above (e.g., with a capacitive sensor).

Furthermore, the embodiments of FIGS. 14a and 14b have zero net linear and angular momentum in the driven linkages, while the embodiment of FIG. 1 has zero net linear momentum but nonzero net angular momentum in the driven linkage. Since transfer of vibration to the sensor package tends to decrease when the driven linkage has zero net linear or angular momentum, the embodiments of FIGS. 14a and 14b should provide reduced package vibration compared to the embodiment of FIG. 1. Reduced vibration can result in reduced measurement errors, such as bias errors and quadrature errors.

In order to maximize the benefit of the common mode rejection of Z-directed angular acceleration provided by the embodiments of FIGS. 14a and 14b, it is preferable for frames 34A and 34B to have substantially the same shape, and for the linkages within frames 34A and 34B to have substantially the same configuration and orientation. This level of symmetry provides motions responsive to Y-directed angular velocity that are substantially equal and opposite, which maximizes the rejection of motions not responsive to Y-directed angular velocity (e.g., motions due to Z-directed angular acceleration).

Figure 15:
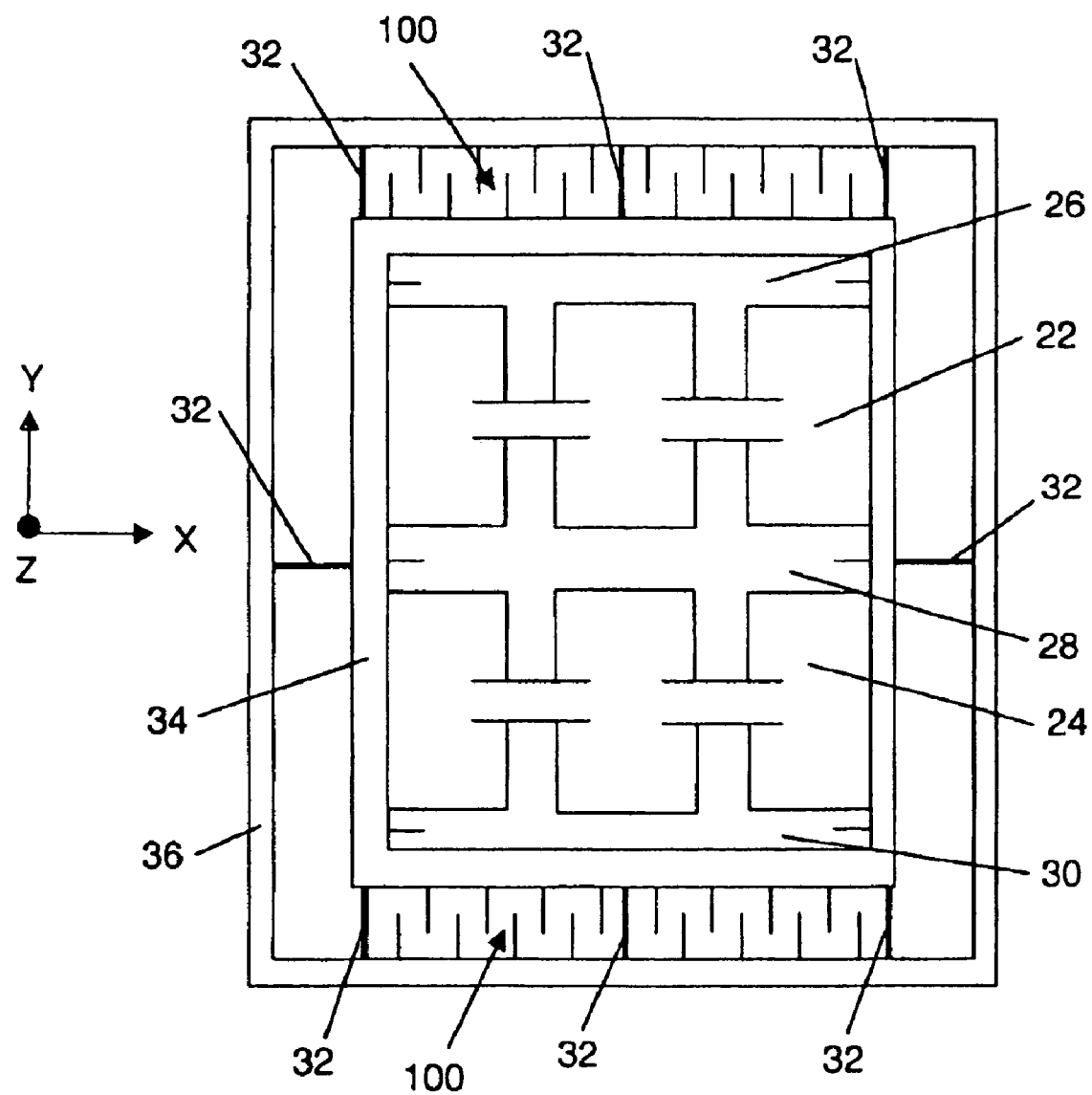
FIG. 15 schematically shows an embodiment of the invention having a rectangular frame.

FIG. 15 schematically shows an alternate embodiment of the invention, where frame 34 and base 36 are rectangular instead of circular. Within frame 34 on FIG. 15, masses 22 and 24 are linked together by plates 26, 28, and 30, similar to the embodiment of FIG. 1. Also as in the embodiment of FIG. 1, the linkage including masses 22 and 24, and plates 26, 28, and 30 is preferably driven into oscillation by electrostatic actuators (not shown on FIG. 15). Rotation of the embodiment of FIG. 15 about the Y axis will induce X-directed Coriolis forces on masses 22 and 24. Frame 34 is connected to base 36 with a plurality of flexures 32 which permit frame 34 to move relative to base 36. The X-directed Coriolis forces on masses 22 and 24 responsive to angular velocity of the sensor about the Y axis tend to cause frame 34 to move relative to base 36 in the X direction. Relative motion between frame 34 and base 36 is preferably sensed with capacitive sensors 100, schematically shown on FIG. 15.

The configuration of frame 34 and flexures 32 on FIG. 15 inhibits overall rotation of frame 34 and senses X-directed deformation of frame 34 responsive to Y-directed angular velocity. An alternate configuration of frame 34 and flexures 32 on FIG. 15 can also be employed, which inhibits X-directed deformation (e.g., by making frame 34 stiffer), and senses rotation of frame 34.

Figure 16A:
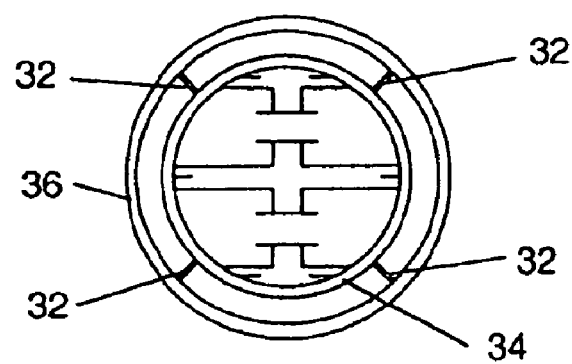
FIGS. 16a and 16b schematically show two other flexure configurations (in addition to the configuration of FIG. 1) which are also suitable for practicing the invention.
Figure 16B:
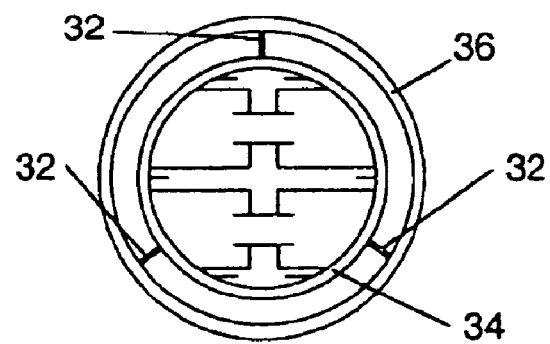

FIGS. 16*a* and 16*b* show examples of alternative configurations for flexures 32 between frame 34 and base 36. FIG. 16*a* shows an arrangement of flexures 32 that is rotated by 45 degrees relative to the arrangement of flexures 32 shown on FIG. 1. FIG. 16*b* shows an arrangement of three flexures 32 symmetrically disposed between frame 34 and base 36. Of course, the invention can be practiced with any arrangement of flexures between frame 34 and base 36 that permit frame 34 to move relative to base 36 responsive to the angular velocity to be sensed.

In the above detailed description of embodiments of the invention, an actuator for driving the linkage into oscillation being an electrostatic actuator was disclosed. Alternate actuators for driving the linkage into oscillation include but are not limited to, electromagnetic actuators, piezoelectric actuators and thermal actuators. Also in the above description, a transducer for sensing angular oscillation of frame 34 being a capacitive sensor was disclosed. Alternate transducers for sensing angular oscillation of frame 34 include but are not limited to, electromagnetic sensors, piezoresistive sensors, and piezoelectric sensors.

In the above detailed description of embodiments of the invention, an actuator for driving frame 34 into angular oscillation being an electrostatic actuator was disclosed. Alternate actuators for driving frame 34 into oscillation include but are not limited to, electromagnetic actuators, piezoelectric actuators and thermal actuators. Also in the above description, a transducer for sensing oscillation of the linkage being a capacitive sensor was disclosed. Alternate transducers for sensing oscillation of the linkage include but are not limited to, electromagnetic sensors, piezoresistive sensors, and piezoelectric sensors.

What is claimed is:

1. A dual-axis sensor for measuring X and Y components of angular velocity in an X-Y sensor plane, the dual-axis sensor comprising:
   a first subsensor for measuring the X component of angular velocity; and
   a second subsensor for measuring the Y component of angular velocity,
   wherein both the first subsensor for measuring the X component of angular velocity and the second subsensor for measuring the Y component of angular velocity are contained together within a single hermetic seal within the dual-axis sensor.

2. The dual-axis sensor of claim 1, wherein the first subsensor and the second subsensor are separated by a barrier seal within the single hermetic seal, the barrier seal to reduce acoustic coupling between the first subsensor and the second subsensor.

3. The dual-axis sensor of claim 2, wherein the barrier seal includes one or more channels formed therein to permit pressure equalization on both the first subsensor and the second subsensor within the single hermetic seal.

4. The dual-axis sensor of claim 1, wherein the dual-axis sensor is fabricated using bulk silicon fabrication.

5. The dual-axis sensor of claim 1, wherein the first subsensor and the second subsensor are contained within a rectangular cavity of the dual-axis sensor, the dual-axis sensor further including a membrane formed over the rectangular cavity.

6. The dual-axis sensor of claim 5, further comprising one or more posts to support the membrane in the cavity.

7. The dual-axis sensor of claim 6, further comprising one or more posts to provide an anchor within the cavity from which a frame of the dual-axis sensor is suspended.

8. The dual-axis sensor of claim 6, further comprising one or more posts to support wafer level integration of a reference wafer associated with the dual-axis sensor, the reference wafer forming a lower portion of the single hermetic seal.

9. The dual-axis sensor of claim 6, wherein the posts provide temporary support of the membrane during the fabrication of mechanical elements associated with the first subsensor and the second subsensor.

10. The dual-axis sensor of claim 1, further comprising stress isolation features for sense mode frequency.

11. The dual-axis sensor of claim 10, wherein the stress isolation features feature comprise of one or more beams.

12. The dual-axis sensor of claim 1, further comprising stress isolation features for robustness during fabrication of the dual-axis sensor.

13. The dual-axis sensor of claim 1, wherein a sense mode frequency of the dual-axis sensor is less than a drive mode frequency of the dual-axis sensor.

14. The dual-axis sensor of claim 1, further comprising a frame including one or more tabs or grooves to limit motion of mechanical elements associated with the first subsensor and the second subsensor.

15. The dual-axis sensor of claim 1, wherein:
   the first subsensor comprises:
   a) a first sensing subassembly comprising:
      i) a substantially planar first frame parallel to the X-Y sensor plane;
      ii) a first mass disposed in the X-Y sensor plane;
      iii) a second mass disposed in the X-Y sensor plane laterally to the first mass; and
      iv) a first linkage within the first frame and connected to the first frame, wherein
   the first linkage is connected to the first mass and to the second mass and wherein the first linkage constrains the first and second masses to move in opposite directions perpendicular to the X-Y sensor plane;
   b) a first actuator for driving a first portion of the first sensing subassembly into oscillation at a drive frequency; and
   c) a first transducer for sensing motion of a second portion of the first sensing subassembly responsive to the X component of angular velocity; and the second subsensor comprises:
   a) a second sensing subassembly comprising:
      i) a substantially planar second frame parallel to the X-Y sensor plane;
      ii) a third mass disposed in the X-Y sensor plane;
      iii) a fourth mass disposed in the X-Y sensor plane laterally to the third mass; and
      iv) a second linkage within the second frame and connected to the second frame,
   wherein the second linkage is connected to the third mass and to the fourth mass and
   wherein the second linkage constrains the third and fourth masses to move in opposite directions perpendicular to the X-Y sensor plane;

b) a second actuator for driving a first portion of the second sensing subassembly into oscillation at a drive frequency; and c) a second transducer for sensing motion of a second portion of the second sensing subassembly responsive to the Y component of angular velocity.

16. The dual-axis sensor of claim 15, wherein the first and second linkages are designed such that in the presence of undesired Z-axis motion, lateral motion is limited by tab and grooves within the dual-axis sensor.

17. The dual-axis sensor of claim 15, wherein the first and second linkages comprise one or more beams.

18. The dual-axis sensor of claim 15, wherein drive motions of the first, second, third, and fourth masses are sensed indirectly.

19. The dual-axis sensor of claim 15, wherein the first, second, third, and fourth masses are actuated indirectly.

20. The dual-axis sensor of claim 19, further comprising one or more split electrodes to indirectly actuate the first, second, third, and fourth masses.

21. The dual-axis sensor of claim 20, wherein the one or more split electrodes are located on edge plates associated with the dual-axis sensor.

22. The dual-axis sensor of claim 15, further comprising one or more electrodes disposed on the first and second frames to differentially sense motion of the first and second frames.

23. The dual-axis sensor of claim 1, further comprising one or more actuators to actuate rotation of a frame of the dual-axis sensor during a self-test mode of operation for measurement of a sense mode frequency associated with the dual-axis sensor.

24. The dual-axis sensor of claim 23, wherein each of the one or more actuators are electrostatic actuators.

25. The dual-axis sensor of claim 24, wherein one or more of the electrostatic actuators utilizes a parallel plate electrode configuration or a comb finger electrode configuration.

26. The dual-axis sensor of claim 1, further comprising one or more shields to shield one or more mechanical elements associated with the first subsensor and the second subsensor from electromagnetic interference (EMI).

27. The dual-axis sensor of claim 1, wherein the first subsensor and the second subsensor are operated at frequencies separated by more than 500 Hz.

* * * * *